US011229033B2

(12) United States Patent
Park et al.

(10) Patent No.: US 11,229,033 B2
(45) Date of Patent: Jan. 18, 2022

(54) OVER-THE-AIR INTERFERENCE COORDINATION

(71) Applicant: QUALCOMM Incorporated, San Diego, CA (US)

(72) Inventors: Sungwoo Park, San Diego, CA (US); Arumugam Chendamarai Kannan, San Diego, CA (US); Vinay Chande, San Diego, CA (US); Srinivas Yerramalli, San Diego, CA (US); Tao Luo, San Diego, CA (US); Xiaoxia Zhang, San Diego, CA (US); Jing Sun, San Diego, CA (US); Kaushik Chakraborty, San Diego, CA (US); Sony Akkarakaran, Poway, CA (US); Olufunmilola Omolade Awoniyi-Oteri, San Diego, CA (US); Zhifei Fan, San Diego, CA (US); Mostafa Khoshnevisan, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 16/855,866

(22) Filed: Apr. 22, 2020

(65) Prior Publication Data

US 2020/0383118 A1 Dec. 3, 2020

Related U.S. Application Data

(60) Provisional application No. 62/856,143, filed on Jun. 2, 2019.

(51) Int. Cl.
*H04W 72/08* (2009.01)
*H04W 24/08* (2009.01)
(Continued)

(52) U.S. Cl.
CPC ......... *H04W 72/082* (2013.01); *H04W 16/28* (2013.01); *H04W 24/08* (2013.01);
(Continued)

(58) Field of Classification Search
CPC . H04W 72/082; H04W 24/08; H04W 72/046; H04W 76/27; H04W 56/001;
(Continued)

(56) References Cited

U.S. PATENT DOCUMENTS

2013/0336224 A1  12/2013  Davydov et al.
2014/0023002 A1   1/2014  John Wilson et al.
(Continued)

FOREIGN PATENT DOCUMENTS

CN   104811916 B   10/2018
EP     2658146 A2   10/2013

OTHER PUBLICATIONS

ETRI: "HeNB Over-the-Air Interference Coordination", 3GPP Draft; R1-101396, 3rd Generation Partnership Project (3GPP), Mobile Competence Centre ; 650, Route Des Lucioles ; F-06921 Sophia-Antipolis Cedex, France, vol. RAN WG1, No. San Francisco, USA; Feb. 22, 2010-Feb. 26, 2010, Feb. 16, 2010 (Feb. 16, 2010), XP050418867, [retrieved on Feb. 16, 2010], p. 1, 2 Pages.
(Continued)

*Primary Examiner* — Kyaw Z Soez
(74) *Attorney, Agent, or Firm* — Holland & Hart LLP

(57) ABSTRACT

Methods, systems, and devices for wireless communications are described. A user equipment (UE) in communication with a serving base station may identify that the UE is a potential victim of interference from a neighboring base station. The UE may transmit an interference coordination message to the neighboring base station. The interference coordination message may request modification of one or more transmission parameters at the neighboring base sta-
(Continued)

FIG. 1 tion. The neighboring base station may modify its transmission parameters to decrease interference with the UE, and the UE may communicate with the serving base station after transmitting the interference coordination message.

44 Claims, 25 Drawing Sheets

(51) Int. Cl.
*H04W 72/04* (2009.01)
*H04W 76/27* (2018.01)
*H04W 56/00* (2009.01)
*H04W 80/02* (2009.01)
*H04W 16/28* (2009.01)

(52) U.S. Cl.
CPC ....... *H04W 56/001* (2013.01); *H04W 72/042* (2013.01); *H04W 72/046* (2013.01); *H04W 76/27* (2018.02); *H04W 80/02* (2013.01)

(58) Field of Classification Search
CPC ... H04W 72/042; H04W 80/02; H04W 16/28; H04W 4/12; H04W 4/10; H04W 4/70; H04W 72/0426; H04W 72/0406; H04W 48/16; H04W 24/02; H04W 24/10
See application file for complete search history.

(56) References Cited

U.S. PATENT DOCUMENTS

| 2014/0024388 | A1* | 1/2014 | Earnshaw ............. H04L 5/0073 |
| | | | 455/452.2 |
| 2014/0086082 | A1 | 3/2014 | Kim et al. |
| 2016/0226534 | A1 | 8/2016 | Suzuki et al. |
| 2020/0351898 | A1* | 11/2020 | Zhao .................... H04W 16/04 |
| 2020/0383167 | A1* | 12/2020 | Sengupta .......... H04W 72/0413 |

OTHER PUBLICATIONS

International Search Report and Written Opinion—PCT/US2020/029596—ISA/EPO—dated Jun. 29, 2020.

* cited by examiner

OVER-THE-AIR INTERFERENCE COORDINATION

CROSS REFERENCE

The present application for patent claims the benefit of U.S. Provisional Patent Application No. 62/856,143 by PARK et al., entitled "OVER-THE-AIR INTERFERENCE COORDINATION," filed Jun. 2, 2019, assigned to the assignee hereof, and expressly incorporated by reference herein.

FIELD OF TECHNOLOGY

The following relates generally to wireless communications and more specifically to over the air interference coordination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Base stations and UEs may communicate using beamforming techniques. For example, a base station may communicate using transmit beams with a UE using receive beams. In some cases, however, transmit beams from a non-serving base station may interfere with the transmit beams of a serving base station that is communicating with the UE, which may lead to decoding inefficiencies or increased use of system resources (e.g., due to retransmissions), among other issues.

SUMMARY

The described techniques relate to improved methods, systems, devices, and apparatuses that support over the air interference coordination. Generally, the described techniques provide for resolving (e.g., minimizing, reducing, or eliminating) interference by utilizing over the air coordination signaling communications. A user equipment (UE) supported by a serving base station may experience interference from a neighboring base station. In such cases, the UE may send an over the air message to indicate to the neighboring base station that the UE is experiencing interference, and may request that the neighboring base station change its communication parameters. In response to the request, the neighboring base station may change one or more communication parameters, such as beam parameters, to reduce interference at the UE.

DETAILED DESCRIPTION

Interference coordination signaling for communications between a user equipment (UE) and a base station may be static, semi-static, or dynamic. In static coordination, information is not exchanged between base stations and UEs about the interference, and the interference coordination is pre-configured. This may result in a non-flexible interference resolution procedure. In semi-static coordination, the base stations may utilize a non-ideal backhaul to exchange information. This non-ideal backhaul may be high latency, and distributed scheduling may be utilized. In dynamic coordination, the base stations may utilize an ideal backhaul for communication, as well as a centralized scheduler to coordinate scheduling. An ideal backhaul may have low latency, but may not be available.

To resolve issues with interference coordination, base stations and UEs may communicate information regarding the interference coordination over the air. A UE may experience interference from a neighboring base station that is not its serving base station. The UE may send an over the air message to indicate to the neighboring base station that the UE is experiencing interference, and may request that the neighboring base station change the beam or synchronization signal block (SSB) that it is using for communication. The interfering base station may then change the beam direction to avoid interfering with transmissions at the UE.

In some cases, the serving base station may receive a report from the UE indicating that the neighboring base station is a potential interfering base station or that the UE is a potential victim of interference from the neighboring base station. The serving base station may determine whether the neighboring base station is a potential interfering base station based on the report, and may transmit a backhaul message to the neighboring base station to indicate the potential interference. The potential interference may include information such as transmit beams, transmission configuration indicator (TCI) states, UE receive beams, SSBs, or the like that may cause or may be related to potential interference at the UE.

Particular aspects of the subject matter described herein may be implemented to realize one or more advantages. The described techniques may support improvements in interference management, spectral efficiency, and latency, among other advantages. As such, supported techniques may include improved network operations and, in some examples, may promote network efficiencies, among other benefits.

Aspects of the disclosure are initially described in the context of wireless communications systems. Aspects are then described with respect to a set of frame structures, process flows, and architectures. Aspects of the disclosure are further illustrated by and described with reference to apparatus diagrams, system diagrams, and flowcharts that relate to handling transport block-level parity check bits for interrupted transmissions.

Figure 1:
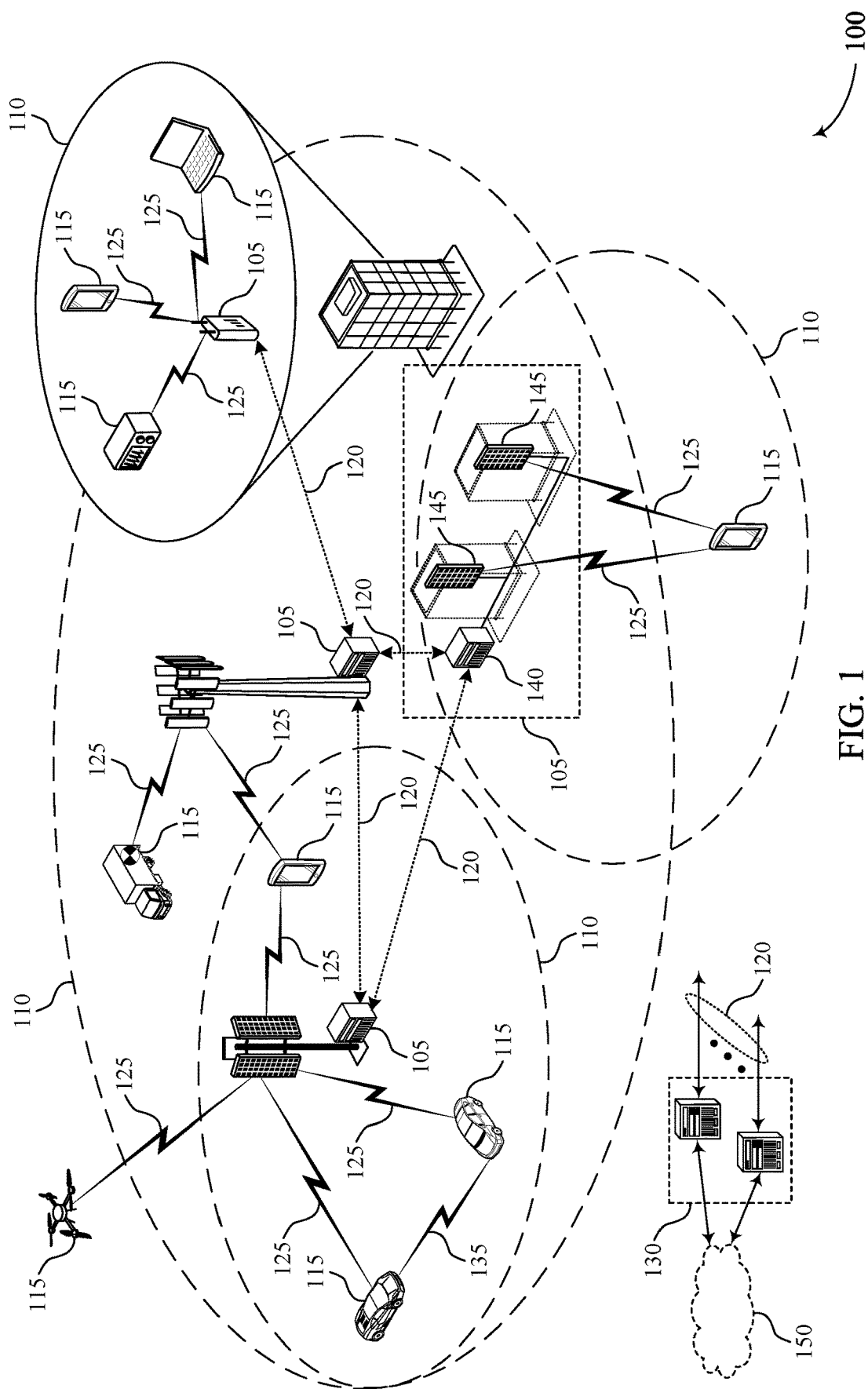
FIGS. 1 through 3 illustrate examples of wireless communication systems that support over the air interference coordination in accordance with aspects of the present disclosure.

FIG. 1 illustrates an example of a wireless communications system 100 that supports over the air interference coordination in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a transmission time interval (TTI). In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

The wireless communications system 100 may implement techniques which improve interference coordination between potential victim UEs and neighboring base stations. Over the air interference coordination may decrease latency and improve responsiveness to potential interference in a wireless communications system. Interfering base stations may change transmission parameters to avoid interference in response to over the air signaling from UEs and backhaul signaling from other base stations that may serve the potential victim UEs.

Figure 2A:
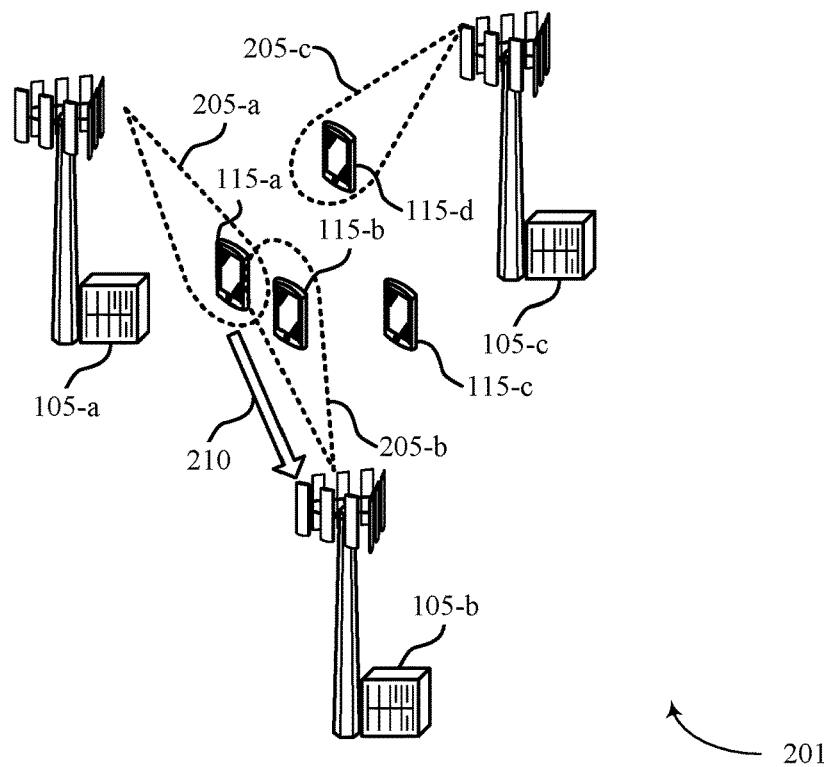
Figure 2B:
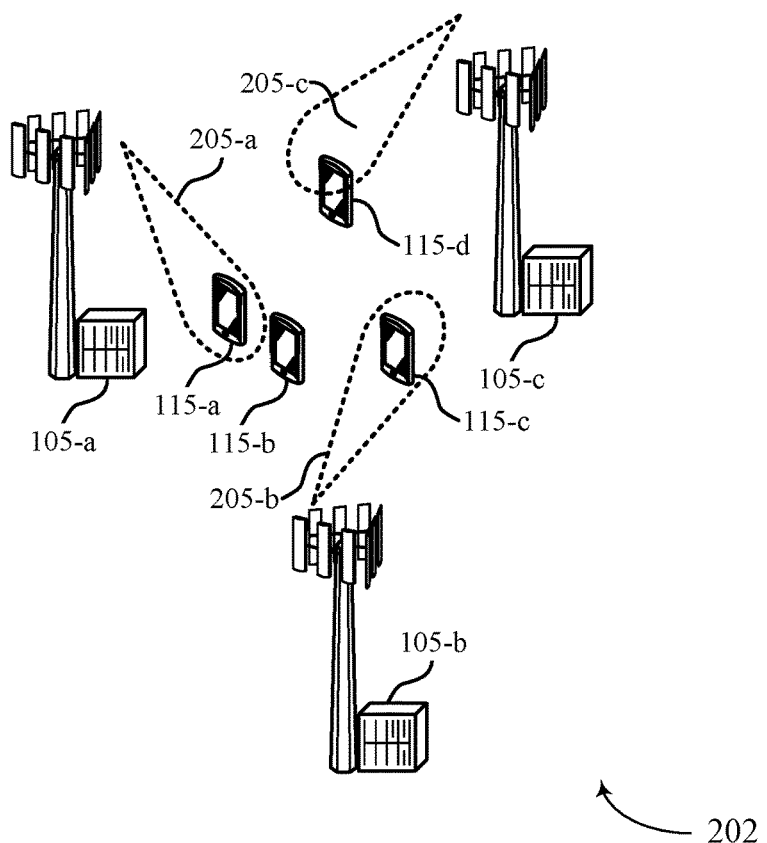

FIGS. 2A and 2B illustrate examples of wireless communications systems 201 and 202 that support over the air interference coordination in accordance with aspects of the present disclosure. In some examples, wireless communications systems 201 and 202 may implement aspects of wireless communications system 100. UEs 115-a, 115-b, 115-c and 115-d may communication with base stations 105-a, 105-b, and 105-c in a beamforming communication system. Base stations 105 may transmit communication on transmit beams 205.

In wireless communications system 201, base stations 105 may communicate information regarding the interference coordination using over the air communication. A UE 115-a may be scheduled to communicate with a serving base station 105-a using beamforming communications. UE 115-a may have designated receive beams, and serving base station 105-a may use designated transmit beams 205 (e.g., beam 205-a) to communicate with UE 115-a. Another base station 105-b may be communicating with a UE 115-b using transmit beam 205-b. Base station 105-c may communicate with UE 115-d using transmit beam 205-c. Base station 105 may communicate over beams 205 by using certain SSBs in the beamforming system according to a configured TCI state that indicates SSB usage and beam configuration.

UE 115-a may experience interference from a neighboring base station 105-b that is not its serving base station 105-a. This may be due to interference from the transmit beam 205-b that is used by base station 105-b in its communications with UE 115-b. UE 115-a may send an over the air coordination signal 210 to neighboring base station 105-b to indicate to neighboring base station 105-b that UE 115-a is experiencing interference, or may experience interference due to the determined SSB configuration of neighboring base station 105-b, and may request that neighboring base station 105-b change the beam 205-b or SSB that it is using for communication. In some cases, the UE 115-a may request that neighboring base station 105-b change the direction beam 205-b.

FIG. 2B shows a wireless communications system 202 after beam switching by neighboring base station 105-b (as indicated in wireless communications system 201). Neighboring base station 105-b may then change the direction of beam 205-b (e.g., use a different transmit beam) to avoid interfering with transmissions at UE 115-a. Base station 105-b may then communicate over transmit beam 205-b to communicate with UE 115-c, rather than UE 115-b, which may have been the communication that caused to interference with communications at UE 115-a. Base station 105-b may transmit a physical downlink shared channel (PDSCH) over the designated SSB, or may determine not to transmit the PDSCH based on the over the air coordination signal 210 from UE 115-a.

As neighboring base station 105-*b* no longer interferes with communications at UE 115-*a*, UE 115-*a* may communicate with its serving base station 105-*a* with a decreased amount of interference and a higher likelihood of successfully decoding transmissions. UE 115-*a* may receive data in a PDSCH from base station 105-*a* over beam 205-*a* without interference from base station 105-*b*, due to the interference coordination message 210 (e.g., over the air coordination signaling).

The interference that UE 115 may experience from neighboring base stations 105 may change over time, and neither the serving base station 105-*a* nor the UE 115-*a* may be able to predict the existence of interference at the time of the PDSCH transmission and reception time. For example, UE 115-*a* may not initially experience interference from a neighboring base station 105-*b*. Because of this, UE 115-*a* may not send an over the air coordination signal 210 to neighboring base station 105-*b* requesting that base station 105-*b* change beams 205-*b*. However, at the time of PDSCH transmit/receive, UE 115-*a* may experience interference from base station 105-*b*, because it did not predict the interference and did not send an over the air coordination signal 210. In another case, UE 115-*a* may initially detect a large amount of interference from base station 105-*b* and may send an over the air coordination signal 210 as a result, but may experience a lower amount of interference at the time of PDSCH communication. Accordingly, neighboring base station 105-*b* may switch beams to avoid interfering with UE 115-*a* with little performance gain.

In order to accommodate changing interference levels, the determination to send the over the air coordination signal 210 may occur semi-statically. In this case, serving base station 105-*a* may determine potential victim UEs 115 when considering possible transmit/receive beam pairs. Whether a UE 115 is a victim or a non-victim UE 115 may change over time depending on the selected receive beam for the UE 115, the transmit beam of the serving base station 105, and the transmit of the neighbor base station 105 (e.g., the potential interferer base station 105). A UE 115 may be configured by the serving base station 105 as a potential victim UE 115 semi-statically. The UE 115 may then send an over the air coordination signal 210 in a specific direction to proactively avoid interference from a neighboring base station 105. The over the air coordination signal 210 may be sent by the UE 115 regardless of whether the interfering base station 105 is currently sending or previously sent the PDSCH on a beam 205 (e.g., beam 205-*b*). This process may be an example of semi-static backhaul coordination.

In some cases, the neighboring base station 105 (e.g., the base station 105 that may be causing interference) may not be able to receive an over the air coordination signal 210, because the neighboring base station 105 may be using different transmit beams 205 than the corresponding receive beams that a UE 115 may use. In this case, the UE 115 may initially experience interference, and may send an over the air coordination message 210 to the neighboring base station 105 to request the neighboring base station 105 to change beams 205. However, the neighboring base station 105 may not receive the over the air coordination signal 210 because the uplink receive beams that a UE 115 uses are different than the downlink transmit beam 205. Since the neighboring base station 105 does not receive the over the air coordination signal 210, the neighboring base station 105 may not change beams 205, and may keep using the downlink transmit beam 205 that interferes with the UE 115. The UE 115 may then still experience the high interference at the time of PDSCH communication.

In this case, the interfering base station 105 may be configured to use a certain transmit beam 205 for PDSCH. In order to use the configured beam 205, the interfering base station 105 may be configured to monitor for the over the air coordination signal 210. The interfering base station 105 may, in some cases, monitor for the over the air coordination signal 210 using the same receive beam 205 as the selected transmit beam 205 that the neighboring base station 105 intends to use for the PDSCH transmission. The interfering base station 105 may monitor for the over the air coordination signal 210 in cases where the base station 105 has been identified as a potential interferer base station 105, and when the configured transmit beam 205 is configured as a potential interfering beam 205 from the viewpoint of the serving base station 105. This process may be a part of dynamic over the air coordination with directional beams.

Figure 3:
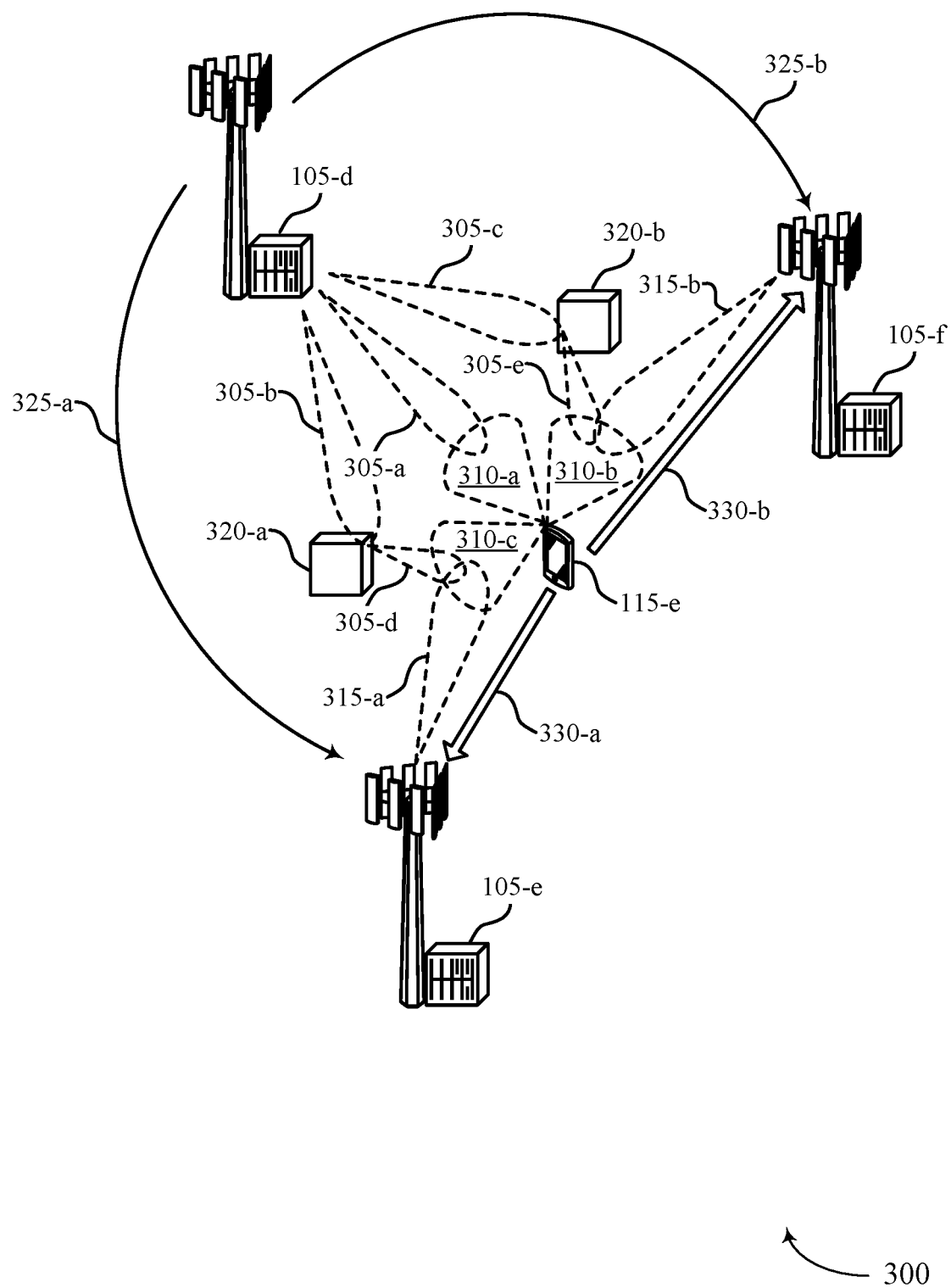

FIG. 3 illustrates an example of a wireless communications system 300 that supports over the air interference coordination in accordance with aspects of the present disclosure. In some examples, wireless communications system 300 may implement aspects of wireless communications systems 100, 201, or 202. A UE 115-*e* may communicate with serving base station 105-*d* using transmit/receive beams 310, and base station 105-*d* may communicate with UE 115-*e* using transmit/receive beams 305, which may reflect off of clusters 320. Base station 105-*e* and 105-*f* may cause interference with UE 115-*e* in cases where transmit beams 315 are used for transmissions and serving base station 105-*d* may communicate with interfering base stations 105-*e* and 105-*f* using backhaul links 325. UE 115-*e* may communicate with potential interfering base station 105-*e* and 105-*f* using over the air coordination signaling 330.

Serving base station 105-*d* may communicate over various transmit beams 305 with UE 115-*e*. Base station 105-*d* may communicate directly with UE 115-*e* using beam 305-*a*, and may communicate indirectly with UE 115-*e* with beams 305-*b* and 305-*c*, which may be reflected off of clusters (e.g., cluster 320-*a* and cluster 320-*b*) as beams 305-*d* and 305-*e*, respectively. UE 115-*e* may receive transmissions from serving base station 105-*d* using receive beams 310. For example, UE 115-*e* may receive transmissions of an SSB corresponding to transmit beam 305-*a* on receive beam 310-*a*. UE 115-*e* may also receive transmissions of SSBs corresponding to transmit beam 305-*b* and reflected transmit beam 305-*d* using receive beam 310-*c*. UE 115-*e* may also be configured to use receive beam 310-*b* to receive transmissions from transmit beam 305-*c* and reflected transmit beam 305-*e*. Each beam pair that serving base station 105-*d* and UE 115-*e* use may correspond to an SSB index or a TCI state. For example, transmit beam 305-*b* may correspond to SSB #0 and TCI state #0, transmit beam 305-*a* may correspond to SSB #1 and TCI state #1, and transmit beam 305-*c* may correspond to SSB #2 and TCI state #2, and so on.

In some aspects, neighboring base station 105-*e* may be a potentially interfering base station. For instance, base station 105-*e* may communicate over beam 315-*a*, which may interfere with communications at UE 115-*e*. transmit beam 315-*a* at base station 105-*e* may correspond to SSB #9, for example. Neighboring base station 105-*f* may also be a potentially interfering base station. Base station 105-*f* may communicate over transmit beam 315-*b*. transmit beam 315-*b* may correspond to SSB #5, for example.

In order to determine potential interference, UE 115-*e* may first determine whether it is a potential victim UE 115 by monitoring neighboring base stations (e.g., base stations 105-*e* and 105-*f*). Whether UE 115-*e* is a potential victim UE may depend on which transmit/receive beams 305 are used by the serving base station 105-*d* and the interfering base station (base station 105-*e* or base station 105-*f*). UE 115-*e* may determine strong potential interference based on the selected SSB (or TCI state) that serving base station 105-*d* is configured to use, which in turn may be used to determine which beam 310 and SSB that UE 115-*e* uses to communicate with serving base station 105-*d*. UE 115-*e* may report potentially interfering base stations 105 to the serving base station 105-*d* via RRC, and may indicate particular interfering SSBs and corresponding transmit beams (e.g., transmit beam 315-*a* or transmit beam 315-*b*) or TCI states. The configured receive beam 310 for UE 115-*e* may also be included in the report to the serving base station.

For example, the UE report to the serving base station may include information as shown in the Table 1 below:

TABLE 1

Example Interference Report Transmitted by a UE to Base Station

| Content | Serving Cell SSB (or TCI) | Potential Interferer | Potential Interfering SSB |
|---|---|---|---|
| 1 | SSB #0 (TCI #0) | Base station 2 | SSB #9 |
| 2 | SSB #1 (TCI #1) | N/A | N/A |
| 3 | SSB #2 (TCI #2) | Base station 1 | SSB #2 |

In this example, Table 1 reports that if the serving base station 105-*d* (e.g., serving cell) is configured to use SSB #0 and TCI state #0 (e.g., using transmit beam 305-*b*), then UE 115-*e* may experience interference from base station 2 (e.g., base station 105-*e*), and that the interference will be caused by SSB #9 and TCI states #9 (e.g., transmit beam 315-*a*) used by base station 105-*e*. If base station 105-*d* is configured to use SSB #1 and TCI state #1 (e.g., using transmit beam 305-*a*), then UE 115-*e* may experience interference from no other base stations and no other interfering SSBs. If base station 105-*d* is configured to use SSB #2 and TCI state #2 (e.g., using transmit beam 305-*c*), then UE 115-*e* may experience interference from base station 1 (e.g., base station 105-*f*), and that the interference may be caused by the use of SSB #2 and TCI state #2 (e.g., transmit beam 315-*b*) used by base station 105-*f*.

Based on receiving such a report from UE 115-*e* including information describing the content of Table 1 or the like, base stations 105 may exchange information by using a backhaul link 325. For example, the serving base station 105-*d* may send messages via the backhaul link 325 to potential interfering base stations (e.g., base station 105-*e* and 105-*f*). The messages may include information describing which SSB (and associated transmit beams 315) that the interfering base station 105 may be configured to use which may cause high interference to beams 305 of the serving base station 105-*d* in its communication with UE 115-*e*.

For example, serving base station 105-*d* may be configured to communicate with beam 305-*b*, which may correspond to SSB #0 and TCI state #0. In this case, according to the table contained in the interference report from UE 115-*e*, serving base station 105-*d* may determine that base station 105-*e* and beam 315-*a* (e.g., SSB #9 and TCI state #9) may cause interference at UE 115-*e*. To prepare for over the air coordination signaling to be transmitted by UE 115-*e* to potentially interfering base station 105-*e*, base station 105-*d* may send a backhaul message over backhaul link 325-*a* to neighboring base station 105-*e*. The backhaul message may indicate that base station 105-*e* may cause interference to UE 115-*e* if base station 105-*e* uses a particular beam (e.g., a beam corresponding to SSB #9 and TCI state #9).

In another case, base station 105-*d* may be configured to use transmit beam 305-*c* corresponding to SSB #2 and TCI state #2. In this case, base station 105-*d* may determine that base station 105-*f* may potentially interfere with communications between serving base station 105-*d* and UE 115-*e*. In such cases, serving base station 105-*d* may prepare for upcoming over the air coordination signaling transmitted by UE 115-*e* to potentially interfering base station 105-*e* by transmitting a backhaul message over backhaul link 325-*b*. The backhaul message may indicate to base station 105-*f* that base station 105-*f* may interfere with UE 115-*e* if base station 105-*f* uses SSB #5 and transmit beam 315-*b*.

Based on communication over the backhaul links 325, potential interfering base stations 105-*e* and 105-*f* may determine whether to monitor for an over the air coordination signal from UE 115-*e*. Neighboring base station 105-*e* and 105-*f* may determine to monitor for the over the air signaling if some conditions are met. For example, a first condition may be that base station 105-*e* received indication via backhaul link 325-*a* from serving base station 105-*a* that neighboring base station 105-*e* may be a potential interferer for the serving base station 105-*d* and the UE 115-*e*. A second condition may be that the indication over backhaul link 325-*a* indicates to base station 105-*e* that the interference would be caused by an SSB that the base station 105-*e* is configured to use for data transmission. If these conditions are met (e.g., that base station 105-*e* received a message from base station 105-*d* over backhaul link 325-*a* and the indication noted that base station 105-*e* using its configured SSB and beam 315-*a*), then base station 105-*e* may monitor for over the air signaling 330-*a* from UE 115-*e*. Base station 105-*e* may use the same beam for monitoring for the over the air signaling 330-*a* that base station 105-*e* is configured to use for downlink transmissions (e.g., transmit beam 315-*a* and SSB #9).

Alternatively, serving base station 105-*d* may determine that it is configured to use SSB #2 corresponding to beam 305-*c*, which, according to Table 1, may indicate that if base station 105-*f* is configured to use SSB #5 (e.g., transmit beam 315-*b*), then transmissions by base station 105-*f* may interfere with communications at UE 115-*e*. Base station 105-*d* may transmit an indication of this potential interference to base station 105-*f*. Base station 105-*f* may monitor for over the air signaling 330-*b* if base station 105-*f* receives signaling over backhaul link 325-*b* that indicates that the configured beam (e.g., SSB #5 and transmit beam 315-*b*) would interfere with communications at UE 115-*e*. If these conditions are met, base station 105-*f* may monitor for over the air signaling 330-*b* from UE 115-*e* using beam 315-*b*.

Over the air signaling 330-*a* and 330-*b* from UE 115-*e* may indicate a request to base station 105-*e* and base station 105-*f*, respectively, to change the SSB # and beam 315 that base station 105 has configured for communications.

In some cases, neighboring base stations 105 may be configured to change beams 315 if they receive over the air signaling 330 from UE 115-*e*. In this case, the wireless communications system 300 may be configured such that the communications between the potential victim UE 115-*e* and base station 105-*d* have priority over the communications of the neighboring base station (e.g., the interfering base station 105-*e*). In this case, if the interfering base station 105-*e* detects the over the air coordination signal 330-*a* from UE 115-*e*, the interfering base station 105-*e* may not transmit data over the PDSCH using beam 315-*a* regardless of the data type of the data in the PDSCH.

In other cases, the data of each PDSCH (either of the serving base station 105-*d* or of the neighboring base stations 105-*e* or 105-*f*) may have different priority levels, and the neighboring base station 105-*e* may determine whether to cancel the PDSCH on beam 315-*a* depending on the priority level of the data in the PDSCH scheduled for transmission on beam 315-*a*. The determination of whether to cancel the transmission may be done by comparing the priority level of the data transmitted by UE 115-*e* and serving base station 105-*d* with the priority level of the data transmitted over beam 315-*a*. The priority level of the data transmitted by the potential victim UE 115-*e* may be transmitted dynamically to the neighboring base station 105-*e* via the over the air signaling 330-*a* or may be transmitted semi-statically to the neighboring base station 105-*e* using backhaul link 325-*a*. The neighboring base station 105-*e* may receive over the air signaling 330-*a* from UE 115-*e*, and may also detect the priority level of the data in the PDSCH of the serving base station 105-*d* communicating with UE 115-*e*. In cases where the data scheduled for transmission to and from UE 115-*e* is determined to have a higher priority level than the data in the PDSCH of the neighboring base station 105-*e*, then the neighboring base station 105-*e* (e.g., the interfering base station 105-*e*) may not transmit its PDSCH. If the data in the PDSCH of the neighboring base station 105-*e* has a higher priority than the data corresponding to UE 115-*e*, then the neighboring base station 105-*e* may determine to transmit its PDSCH regardless of whether UE 115-*e* transmitted over the air coordination signaling 330-*a* to the neighboring base station indicating potential interference from base station 105-*e*.

Additionally or alternatively, the UE 115-*e* may modify one or more communication parameters for subsequent communications with serving base station 105-*d* in case neighboring base station 105-*e* or 105-*f* is a potential interfering base station. For example, the UE 115-*e* may configure one or more receive beams 310 to be a narrow beam (e.g., the UE 115-*e* may modify the beam width (or other beam parameters) for an receive beam 310) to reduce interference received from a potential interfering base station. In some cases, by using a narrower beam for receiving communications from base station 105-*d*, the UE 115-*e* may not experience interference or may experience less interference from a potential interfering base station as the narrower beam may reduce the received power of signals from neighboring base stations 105-*e* or 105-*f*.

Figure 4:
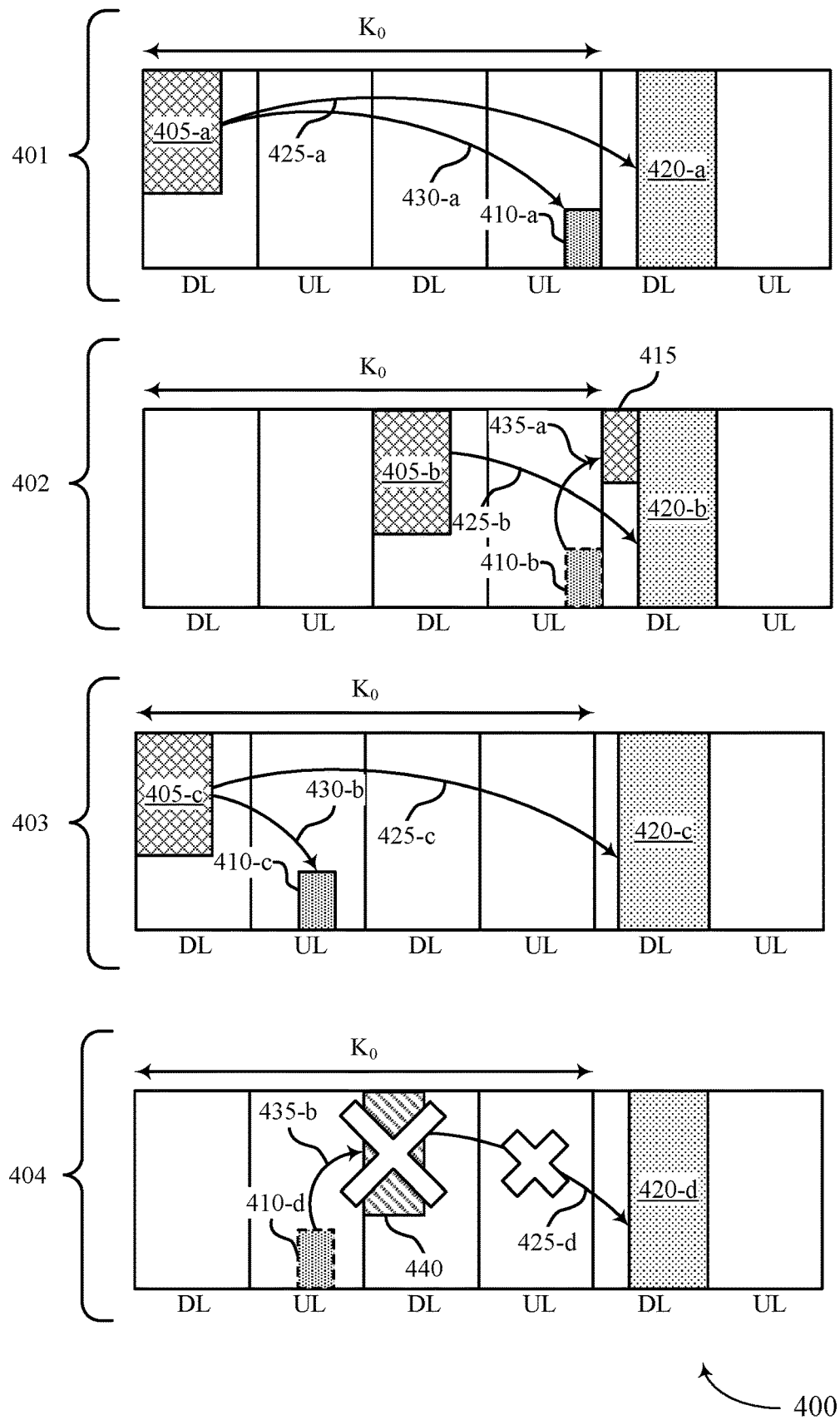
FIG. 4 illustrates an example set of frame structures that supports over the air interference coordination in accordance with aspects of the present disclosure.

FIG. 4 illustrates an example set of a frame structures 400 that supports over the air interference coordination in accordance with aspects of the present disclosure. In some examples, frame structure 400 may implement aspects of wireless communications systems 100, 201, 202, or 300. Frame structure 401 illustrates scheduling of uplink and downlink communications between a UE 115 and a serving base station 105 that may have a longer configured gap. Frame structure 402 illustrates scheduling of uplink and downlink communications between a UE 115 and a potentially interfering base station based on over the air coordination signaling as transmitted by a UE 115 in frame structure 401. Frame structure 403 illustrates uplink and downlink communications scheduling between a UE 115 and a serving base station 105. Frame structure 404 illustrates uplink and resulting communications after the over the air coordination signaling in frame structure 403. As described herein, $K_0$ may be a time gap between a PDCCH (e.g., carrying downlink control information (DCI)) and a corresponding PDSCH. In some cases, $K_0$ may be preconfigured at the UE 115, the serving base station, or both.

If the serving base station 105 is configured to send data using a transmit beam to a potential victim UE 115, then serving base station 105 may use dynamic over the air coordination. Serving base station 105 may transmit DCI 405 to UE 115 that may indicate the transmit beam, configuration, and the TCI state configuration of serving base station 105. The DCI may also indicate the existence of the over the air coordination signal and its contents, which may include frequency resources, time resources, transmit timing, uplink transmit beam index, or other parameters. UE 115 may transmit over the air coordination signaling to a neighboring base station before a scheduled PDSCH 420.

As shown in frame 401, a UE 115 may receive DCI 405-*a* in a first downlink slot. DCI 405-*a* may indicate (at 430-*a*) the scheduling of the transmission of over the air signaling 410-*a* by UE 115. DCI 405-*a* may also indicate (at 425-*a*) the scheduling of the transmission of a future PDSCH from a serving base station. Thus, UE 115 may transmit the over the air coordination signaling 410-*a* at some time before the transmission of scheduled PDSCH 420-*a*, in order to avoid interference with PDSCH 420-*a* from a neighboring base station 105. The timing of the over the air coordination signaling transmission may be preconfigured or may be dynamically configured (e.g., via RRC signaling, MAC-CE signaling, in the DCI, or in other messaging).

In some cases, the UE 115 may use the same beam for uplink over the air coordination signaling transmission 410 that it uses for the downlink PDSCH reception. In other cases, the UE 115 may use a different transmit beam for the uplink over the air coordination signaling 410 transmission than the receive beam the UE 115 uses for reception of the downlink PDSCH 420. The beam index may be indicated to the UE 115 via RRC signaling, MAC-CE signaling, in the DCI, or in other messaging.

There may be a given time gap between the UE 115 transmitting the uplink over the air coordination signaling 410 and the UE 115 receiving the PDSCH 420 from its serving base station 105. The time gap and the time that the UE 115 transmits the over the air signaling 410 may be pre-configured or may be dynamic and indicated via RRC signaling, MAC-CE signaling, DCI, or a combination thereof. The time gap value may a common gap time that may be shared by the serving base station 105 and the potentially interfering base station 105. For example, frame structures 401 and 403 shows a short time gap between transmission of over the air signaling 410 and reception of PDSCH 420. This time gap may be preconfigured or dynamically configured.

Frame structure 401 shows an example uplink and downlink transmission configuration. A UE 115 may receive DCI 405-*a* in a first downlink slot. DCI 405-*a* may indicate (430-*a*) the scheduling of the transmission of over the air signaling 410-*a* by UE 115. DCI 405-*a* may also indicate (at 425-*a*) the scheduling of the transmission of PDSCH 420-*a* from a serving base station 105. Thus, UE 115 may transmit the over the air signaling 410-*a* at some time before the scheduled transmission of PDSCH 420-*a* in an attempt to prevent interference for reception of PDSCH 420-*a* by a UE 115.

Frame structure 402 shows an example of the over the air coordination signaling 410-*b* response from the perspective of a neighboring (and potentially interfering) base station 105 based on the transmission of the over the air coordination signaling by a UE 115. A base station 105 may transmit DCI 405-*b*, which may indicate its configured transmit beam and other transmission information, including the scheduling of a PDSCH 420-*b*. The scheduled PDSCH 420-*b* may coincide with the scheduled PDSCH 420-*a* by a serving base station 105. Based on determining potential interference, a UE 115 may transmit over the air coordination signaling 410-*b* to the potentially interfering base station 105. Interfering base station 105 may receive the over the air coordination signaling 410-*b*, then transmit a DCI 415 to its served UE 115 to cancel transmission of the potentially interfering PDSCH 420-*b*. The UE 115 served by the serving base station 105 may also receive DCI 415, which may indicate to the served UE 115 to ignore the information in DCI 405-*b*, and thus not attempt to decode interfering PDSCH 420-*b*. The transmission of DCI 415 may be determined by the reception of over the air signaling 410-*b* (e.g., indicated at 435-*a*). Thus, the potential victim UE 115 may be able to receive a communications (e.g., PDSCH 420-*a*) from serving base station 105 without interference from an interfering base station 105 and the PDSCH 420-*b*.

In other cases, the time gap may be longer between the transmission of the over the air signaling 410 by UE 115 and the reception of a potentially interfering PDSCH 420-*c* from a neighbor base station 105. The time gap shown in frame structures 403 and 404 show a longer time gap between the transmission of the over the air signaling 410 by UE 115 and the schedule transmission of the PDSCH 420 by neighbor base station 105. This longer time gap may also be preconfigured or dynamically configured (e.g., via RRC signaling, MAC-CE signaling, in the DCI, or in other messaging).

In frame structure 403, depicting communications between a serving base station 105 and a UE 115, a serving base station 105 may transmit DCI 405-*c* indicating (at 430-*b*) scheduling for a UE 115 to transmit over the air coordination signaling 410-*c* to a neighboring (and potentially interfering) base station 105. DCI 405-*c* may also indicate (at 425-*c*) scheduling of PDSCH 420-*c* that may be transmitted by the serving base station 105 to the served UE 115.

In frame structure 404, depicting communications between a neighboring base station 105 and a UE 115, a UE 115 may transmit over the air coordination signaling 410-*d* to the neighboring base station 105 prior to a grant 440 (e.g., a DCI) transmitted by the potentially interfering base station 105. The potentially interfering base station 105 may detect the over the air coordination signaling 410-*d* prior to a grant 440 that schedules PDSCH 420-*d* for a UE 115 served by neighboring (and potentially interfering) base station 105. In this example, because the over the air signaling is transmitted to the potentially interfering base station 105 with a longer time gap before the time of the to-be-scheduled PDSCH 420-*d*, the interfering base station 105 may not send a grant 440 to schedule (at 425-*d*) the interfering PDSCH 420-*d*. The interfering PDSCH 420-*d* may have otherwise been transmitted to a UE 115 served by interfering base station 105, but may have interfered with the UE 115 communicating with the serving base station 105.

Figure 5:
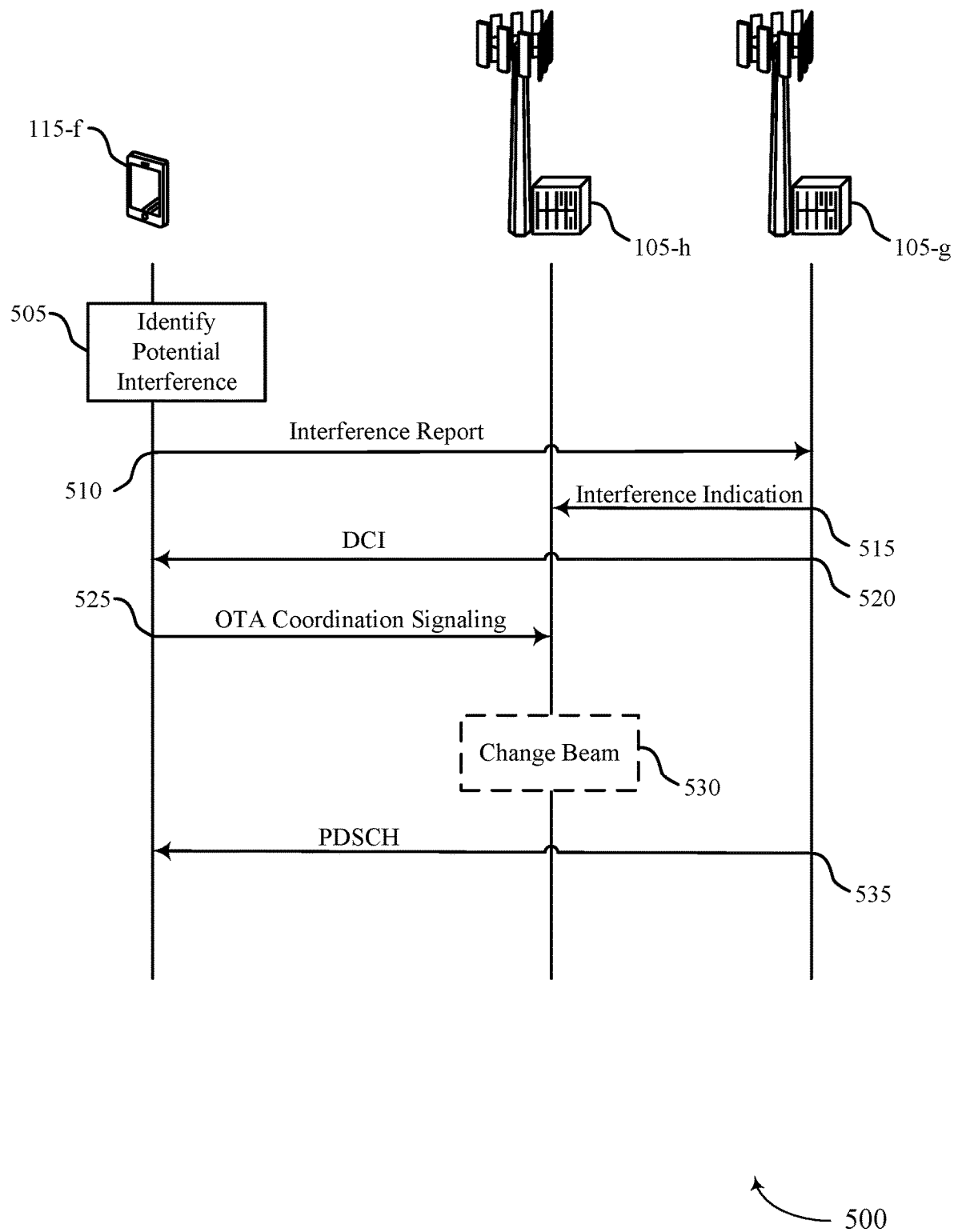
FIG. 5 illustrates an example of process flow that supports over the air interference coordination in accordance with aspects of the present disclosure.

FIG. 5 illustrates an example of a process flow 500 that supports over the air interference coordination in accordance with aspects of the present disclosure. In some examples, process flow 500 may implement aspects of wireless communications systems 100, 201, 202, or 300. The process flow 500 may include UE 115-*f* and base stations 105-*g* and 105-*h*, which may be respective examples of a UE 115 and a base station 105 as described herein.

At 505, UE 115-*f* may identify potential interference from neighboring base stations 105. UE 115-*f* may, in some cases, monitor for signaling from at least one of serving base station 105-*g* and neighboring base station 105-*h* (or other neighboring base stations) by using a receive beam (e.g., and receive beam) of UE 115-*f* UE 115-*f* may receive signaling from serving base station 105-*g* and may also receive signaling from a neighboring base station 105 (e.g., neighboring base station 105-*h*). UE 115-*f* may identify that UE 115-*f* is a potential victim of interference from a neighboring base station 105-*h*.

In order to identify potential interference, UE 115-*f* may receive a first signal from serving base station 105-*g* via a first receive beam of a set of receive beams. The first signal may be associated with a first TCI state or a first SSB of serving base station 105-*g*. The UE 115-*f* may also receive a second signal from neighboring base station 105-*h* via the first UE receive beam of the set of receive beams. The second signal may be associated with a second TCI state of a second SSB of neighboring base station 105-*h*. UE 115-*f* may determine that neighboring base station 105-*h* is a potential interfering base station based at least in part of receiving the first and second signals.

At 510, UE 115-*f* may transmit an interference report to serving base station 105-*g*. In some cases, the interference report may indicate that the configured beams used by serving base station 105-*g* and neighboring base station 105-*h* may cause interference at UE 115-*f*. The interference report may indicate information related to neighboring base station 105-*h*, the first TCI state, the second TCI state, the first SSB, the second SSB, the first receive beam, or any combination thereof. Interference report may indicate information as shown in Table 1, for example. The interference report may be transmitted via RRC signaling.

Based on receiving the interference report 510 from UE 115-*f*, base station 105-*g* may identify that UE 115-*f* is a potential victim of interference from a neighboring base station. Base station 105-*g* may transmit additional signaling to UE 115-*f* indicating that UE 115-*f* is a potential victim UE of interference from a neighboring base station 105. Based on receiving the interference report from UE 115-*f*, serving base station 105-*g* may determine that a neighboring base station 105-*h* is a potential interfering base station.

Therefore, at 515, serving base station 105-*g* may transmit a backhaul message to neighboring base station 105-*h* to configure neighboring base station 105-*h* as a potential interfering base station.

At 520, base station 105-*g* may transmit a DCI to UE 115-*f*. This DCI may indicate to UE 115-*f* whether to transmit an over the air coordination signal based on determining whether UE 115-*f* is a potential victim UE.

Base station 105-*h* may receive interference indication message at 515 from serving base station 105-*g*. Based on receiving this message, base station 105-*h* may identify that base station 105-*h* is a potential interfering base station. Base station 105-*h* may monitor for interference coordination message (e.g., over the air coordination signaling) from UE 115-*f* Neighboring base station 105-*h* may identify a downlink shared channel transmission for a second UE 115 in communication with neighboring base station 105-*h*, and may determine whether to transmit the PDSCH to the other UE 115 based on monitoring for the interference coordination signaling from UE 115-*f*.

At 525, UE 115-*f* may transmit an interference coordination message (e.g., over the air coordination signaling) to the neighboring base station 105-*h* (e.g., an interfering base station 105) based on identifying that UE 115-*f* is a potential victim UE. The interference coordination message may request modification of one or more transmission parameters at neighboring base station 105-*h*. UE 115-*f* may transmit the interference coordination message before the scheduled PDSCH transmission from serving base station 105-*g*. UE 115-*f* may transmit the interference coordination message via the same beam or a different beam that the beam used for reception of the scheduled downlink shared channel transmission (e.g., PDSCH). UE 115-*f* may also receive an indication of a beam index for transmission of the interference coordination message via one of RRC, MAC-CE, or DCI.

UE 115-*f* may identify a gap between transmission of the interference coordination message and the PDSCH (either from serving base station 105-*g* or neighboring base station 105-*h*). UE 115-*f* may monitor resources allocated for the PDSCH according to the gap following the transmission of the interference coordination message.

At 530, in some cases, neighboring base station 105-*h* may refrain from transmitting the downlink shared channel transmission to the second UE based at least in part on detecting the interference coordination message from UE 115-*f*. Neighboring base station 105-*h* may determine not to transmit by changing beams at 530. In other cases, based on a priority determination, neighboring base station 105-*h* may determine not to change beams at 530, and may determine to maintain the transmission of the downlink shared channel to the second UE, regardless of receiving the interference coordination signaling from UE 115-*f*.

At 535, UE 115-*f* may communicate with serving base station 105-*g* based on receiving a PDSCH at 535 from serving base station 105-*g*. Depending on whether neighboring base station 105-*h* determined to change its beam at 530, the communication at 535 between UE 115-*f* and base station 105-*g* may have high interference (if base station 105-*h* did not change its beam at 530) or low interference (if base station 105-*h* did change its beam at 530).

In the above description of the process flow 500, the signaling may be transmitted or the operations may be performed in a different order or at different times than the example order shown. Some signaling or operations may be omitted from the process flow 500, and other operations may be added to the process flow 500. Additionally or alternatively, the operations performed by UE 115-*f*, base station 105-*g*, and base station 105-*h* of process flow 500, such as the interference report 510 and the over the air coordination signaling 525 may reduce interference at UE 115-*f* and, in some examples, may promote improvements to latency and use of system resources, among other benefits.

Figure 6:
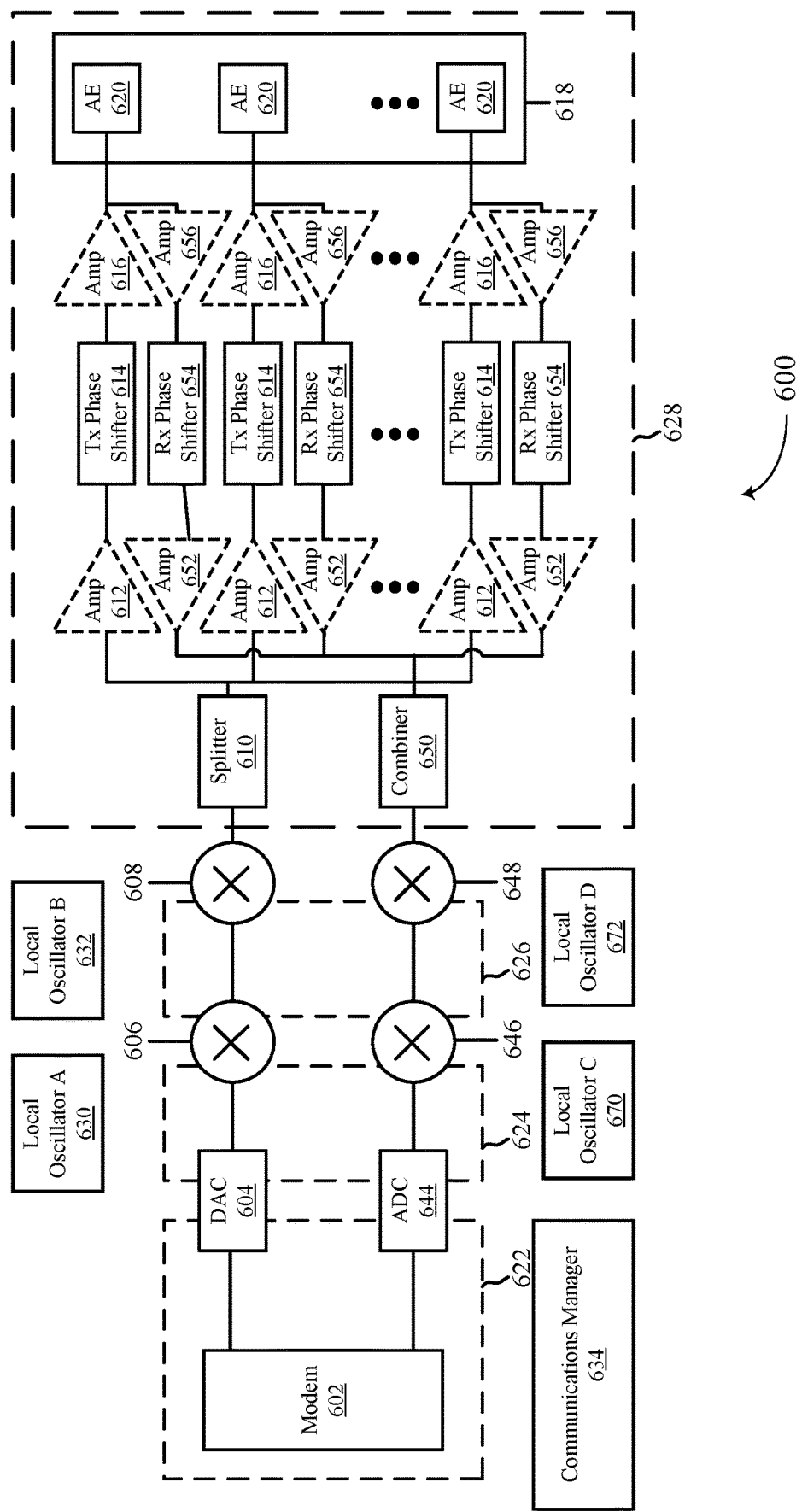
FIG. 6 illustrates an example of an architecture that supports over the air interference coordination in accordance with aspects of the present disclosure.

FIG. 6 illustrates an example of an architecture 600 that supports methods for beam refinement in a mmW channel in accordance with aspects of the present disclosure. In some examples, architecture 600 may implement aspects of wireless communication systems 100, 200, 300, or set of frame structures 400. In some aspects, diagram 600 may be an example of the receiving device (e.g., a first wireless device) or a transmitting device (e.g., a second wireless device), as described herein.

Broadly, FIG. 6 is a diagram illustrating example hardware components of a wireless device in accordance with aspects of the disclosure. The illustrated components may include those that may be used for antenna element selection or for beamforming for transmission of wireless signals. There are numerous architectures for antenna element selection and implementing phase shifting, one example of which is illustrated here. The architecture 600 includes a modem (modulator/demodulator) 602, a digital to analog converter (DAC) 604, a first mixer 606, a second mixer 608, and a splitter 610. The architecture 600 also includes a plurality of first amplifiers 612, a plurality of phase shifters 614, a plurality of second amplifiers 616, and an antenna array 618 that includes a plurality of antenna elements 620. Transmission lines or other waveguides, wires, traces, or the like are shown connecting the various components to illustrate how signals to be transmitted may travel between components. Boxes 622, 624, 626, and 628 indicate regions in the architecture 600 in which different types of signals travel or are processed. Specifically, box 622 indicates a region in which digital baseband signals travel or are processed, box 624 indicates a region in which analog baseband signals travel or are processed, box 626 indicates a region in which analog intermediate frequency (IF) signals travel or are processed, and box 628 indicates a region in which analog radio frequency (RF) signals travel or are processed. The architecture also includes a local oscillator A 630, a local oscillator B 632, and a communications manager 634.

Each of the antenna elements 620 may include one or more sub-elements (not shown) for radiating or receiving RF signals. For example, a single antenna element 620 may include a first sub-element cross-polarized with a second sub-element that can be used to independently transmit cross-polarized signals. The antenna elements 620 may include patch antennas or other types of antennas arranged in a linear, two dimensional, or other pattern. A spacing between antenna elements 620 may be such that signals with a desired wavelength transmitted separately by the antenna elements 620 may interact or interfere (e.g., to form a desired beam). For example, given an expected range of wavelengths or frequencies, the spacing may provide a quarter wavelength, half wavelength, or other fraction of a wavelength of spacing between neighboring antenna elements 620 to allow for interaction or interference of signals transmitted by the separate antenna elements 620 within that expected range.

The modem 602 processes and generates digital baseband signals and may also control operation of the DAC 604, first and second mixers 606, 608, splitter 610, first amplifiers 612, phase shifters 614, or the second amplifiers 616 to transmit signals via one or more or all of the antenna elements 620. The modem 602 may process signals and control operation in accordance with a communication standard such as a wireless standard discussed herein. The DAC 604 may convert digital baseband signals received from the modem 602 (and that are to be transmitted) into analog baseband signals. The first mixer 606 upconverts analog baseband signals to analog IF signals within an IF using a local oscillator A 630. For example, the first mixer 606 may mix the signals with an oscillating signal generated by the local oscillator A 630 to "move" the baseband analog signals to the IF. In some cases, processing or filtering (not shown) may take place at the IF. The second mixer 608 upconverts the analog IF signals to analog RF signals using the local oscillator B 632. Similarly to the first mixer, the second mixer 608 may mix the signals with an oscillating signal generated by the local oscillator B 632 to "move" the IF analog signals to the RF, or the frequency at which signals will be transmitted or received. The modem 602 or the communications manager 634 may adjust the frequency of local oscillator A 630 or the local oscillator B 632 so that a desired IF or RF frequency is produced and used to facilitate processing and transmission of a signal within a desired bandwidth.

In the illustrated architecture 600, signals upconverted by the second mixer 608 are split or duplicated into multiple signals by the splitter 610. The splitter 610 in architecture 600 splits the RF signal into a plurality of identical or nearly identical RF signals, as denoted by its presence in box 628. In other examples, the split may take place with any type of signal including with baseband digital, baseband analog, or IF analog signals. Each of these signals may correspond to an antenna element 620 and the signal travels through and is processed by amplifiers 612, 616, phase shifters 614, or other elements corresponding to the respective antenna element 620 to be provided to and transmitted by the corresponding antenna element 620 of the antenna array 618. In one embodiment, the splitter 610 may be an active splitter that is connected to a power supply and provides some gain so that RF signals exiting the splitter 610 are at a power level equal to or greater than the signal entering the splitter 610. In another example, the splitter 610 is a passive splitter that is not connected to power supply and the RF signals exiting the splitter 610 may be at a power level lower than the RF signal entering the splitter 610.

After being split by the splitter 610, the resulting RF signals may enter an amplifier, such as a first amplifier 612, or a phase shifter 614 corresponding to an antenna element 620. The first and second amplifiers 612, 616 are illustrated with dashed lines because one or both of them may not be used in some implementations. In one implementation, both the first amplifier 612 and second amplifier 614 are present. In another, neither the first amplifier 612 nor the second amplifier 614 is present. In other implementations, one of the two amplifiers 612, 614 is present but not the other. By way of example, if the splitter 610 is an active splitter, the first amplifier 612 may not be used. By way of further example, if the phase shifter 614 is an active phase shifter that can provide a gain, the second amplifier 616 might not be used. The amplifiers 612, 616 may provide a desired level of positive or negative gain. A positive gain (positive dB) may be used to increase an amplitude of a signal for radiation by a specific antenna element 620. A negative gain (negative dB) may be used to decrease an amplitude or suppress radiation of the signal by a specific antenna element. Each of the amplifiers 612, 616 may be controlled independently (e.g., by the modem 602 or communications manager 634) to provide independent control of the gain for each antenna element 620. For example, the modem 602 or the communications manager 634 may have at least one control line connected to each of the splitter 610, first amplifiers 612, phase shifters 614, or second amplifiers 616 which may be used to configure a gain to provide a desired amount of gain for each component and thus each antenna element 620.

The phase shifter 614 may provide a configurable phase shift or phase offset to a corresponding RF signal to be transmitted. The phase shifter 614 could be a passive phase shifter not directly connected to a power supply. Passive phase shifters might introduce some insertion loss. The second amplifier 616 could boost the signal to compensate for the insertion loss. The phase shifter 614 could be an active phase shifter connected to a power supply such that the active phase shifter provides some amount of gain or prevents insertion loss. The settings of each of the phase shifters 614 are independent meaning that each can be set to provide a desired amount of phase shift or the same amount of phase shift or some other configuration. The modem 602 or the communications manager 634 may have at least one control line connected to each of the phase shifters 614 and which may be used to configure the phase shifters 614 to provide a desired amounts of phase shift or phase offset between antenna elements 620.

The architecture 600 is given by way of example to illustrate an architecture for transmitting or receiving signals. It will be understood that the architecture 600 or each portion of the architecture 600 may be repeated multiple times within an architecture to accommodate or provide an arbitrary number of RF chains, antenna elements, or antenna panels. Further, numerous alternate architectures are possible and contemplated. For example, although only a single antenna array 618 is shown, two, three, or more antenna arrays may be included each with one or more of their own corresponding amplifiers, phase shifters, splitters, mixers, DACs, or modems. For example, a single UE may include two, four or more antenna arrays for transmitting or receiving signals at different physical locations on the UE or in different directions. Further, mixers, splitters, amplifiers, phase shifters and other components may be located in different signal type areas (e.g., different ones of the boxes 622, 624, 626, 628) in different implemented architectures. For example, a split of the signal to be transmitted into a plurality of signals may take place at the analog RF, analog IF, analog baseband, or digital baseband frequencies in different implementations.

Similarly, amplification or phase shifts may also take place at different frequencies. For example, in some contemplated implementations, one or more of the splitter 610, amplifiers 612, 616, or phase shifters 614 may be located between the DAC 604 and the first mixer 606 or between the first mixer 606 and the second mixer 608. In one example, the functions of one or more of the components may be combined into one component. For example, the phase shifters 614 may perform amplification to include or replace the first or second amplifiers 612, 616. By way of another example, a phase shift may be implemented by the second mixer 608 to obviate the use of a separate phase shifter 614. This technique is sometimes called local oscillator (LO) phase shifting. In one implementation of this configuration, there may be a plurality of IF to RF mixers (e.g., for each antenna element chain) within the second mixer 608 and the local oscillator B 632 would supply different local oscillator signals (with different phase offsets) to each IF to RF mixer.

The modem 602 or the communications manager 634 may control one or more of the other components to select one or more antenna elements 620 or to form beams for transmission of one or more signals. For example, the antenna elements 620 may be individually selected or deselected for transmission of a signal (or signals) by controlling an amplitude of one or more corresponding amplifiers, such as the first amplifiers 612 or the second amplifiers 616. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 620, the radiated signals interact, interfere (constructive and destructive interference), and amplify each other to form a resulting beam. The shape (such as the amplitude, width, or presence of side lobes) and the direction (such as an angle of the beam relative to a surface of the antenna array 618) can be dynamically controlled by modifying the phase shifts or phase offsets imparted by the phase shifters 614 and amplitudes imparted by the amplifiers 612, 616 of the plurality of signals relative to each other.

The communications manager 634 may, when architecture 600 is configured as a receiving device, perform a first set of beam measurements for a first plurality of beams over a wireless channel between the first wireless device and a second wireless device, each beam in the first plurality of beams having a first beam-width. The communications manager 634 may transmit to the second wireless device a first beam measurement report for the first plurality of beams, the first beam measurement report indicating a beam sweep order for a second set of beam measurements for a second plurality of beams. The communications manager 634 may perform the second set of beam measurements for the second plurality of beams over the wireless channel according to the indicated beam sweep order, each beam in the second plurality of beams having a second beam-width that is narrower than the first beam-width. The communications manager 634 may transmit to the second wireless device a second beam measurement report based at least in part on the second set of beam measurements. The communications manager 634 may receive from the second wireless device an indication of a beam selection for transmissions from the second wireless device based at least in part on the first and second set of beam measurements.

The communications manager 634, when architecture 600 is configured as a transmitting device, may transmit a first plurality of beams over a wireless channel between the second wireless device and a first wireless device, each beam in the first plurality of beams having a first beam-width. The communications manager 634 may receive, from the first wireless device, a first beam measurement report for a first plurality of beams, the first beam measurement report indicating a beam sweep order for a second set of beam measurements for a second plurality of beams. The communications manager 634 may transmit the second plurality of beams according to the indicated beam sweep order, each beam in the second plurality of beams having a second beam-width that is narrower than the first beam-width. The communications manager 634 may receive a second beam measurement report from the first wireless device based at least in part on the second plurality of beams. The communications manager 634 may transmit to the first wireless device an indication of a beam selected for transmissions from the second wireless device based at least in part on the second beam measurement report.

The communications manager 634 may be located partially or fully within one or more other components of the architecture 600. For example, the communications manager 634 may be located within the modem 602 in at least one implementation.

Figure 7:
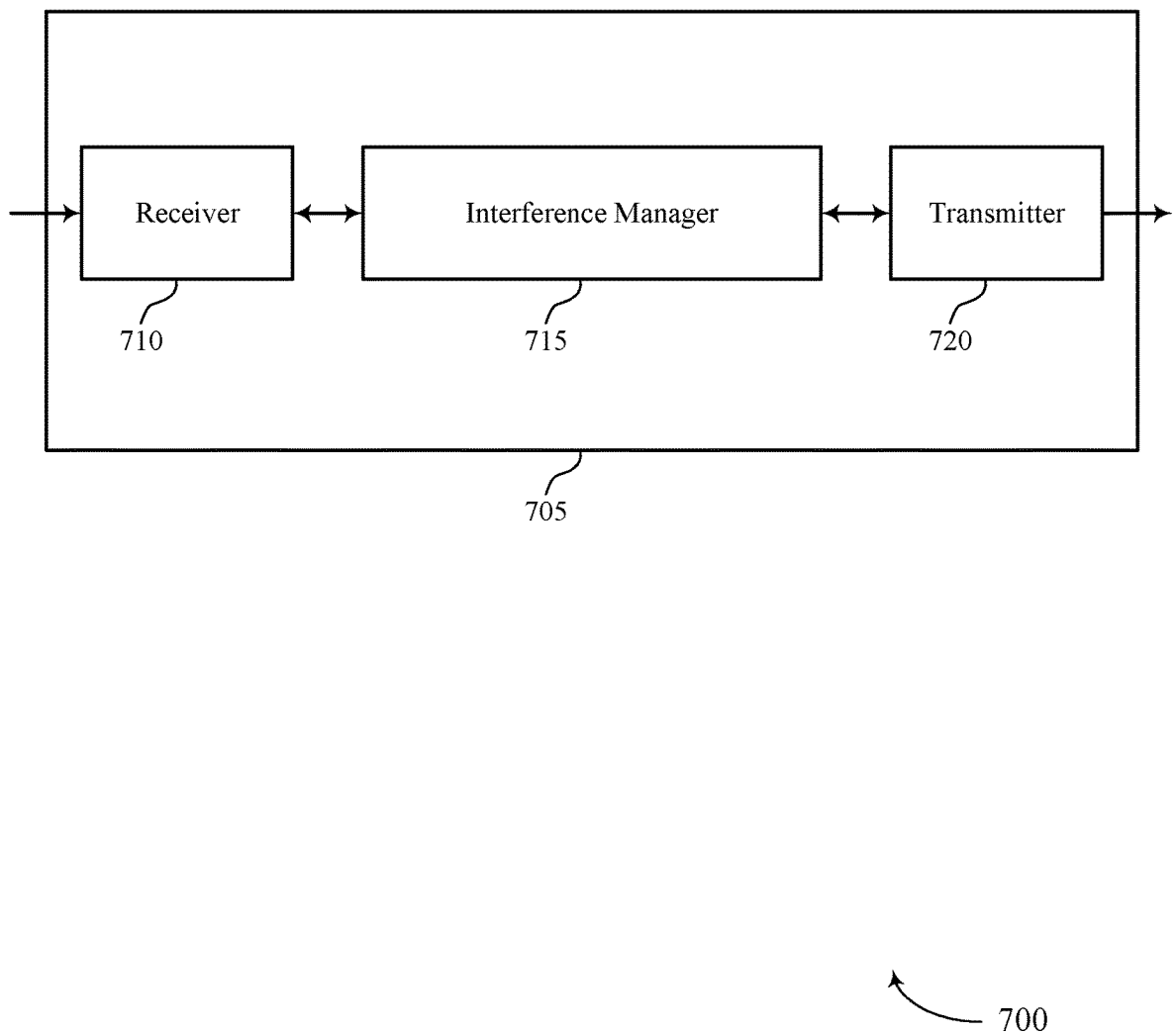
FIGS. 7 and 8 show block diagrams of devices that support over the air interference coordination in accordance with aspects of the present disclosure.

FIG. 7 shows a block diagram 700 of a device 705 that supports over the air interference coordination in accordance with aspects of the present disclosure. The device 705 may be an example of aspects of a UE 115 as described herein. The device 705 may include a receiver 710, an interference manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to over the air interference coordination, etc.). Information may be passed on to other components of the device 705. The receiver 710 may be an example of aspects of the transceiver 1020 described with reference to FIG. 10. The receiver 710 may utilize a single antenna or a set of antennas.

The interference manager 715 may identify, by the UE in communication with a serving base station, that the UE is a potential victim of interference from a neighboring base station, transmit an interference coordination message to the neighboring base station based on the identifying, the interference coordination message requesting modification of one or more transmission parameters at the neighboring base station, and communicate with the serving base station after transmitting the interference coordination message. The interference manager 715 may be an example of aspects of the interference manager 1010 described herein.

The interference manager 715, or its sub-components, may be implemented in hardware, code (e.g., software or firmware) executed by a processor, or any combination thereof. If implemented in code executed by a processor, the functions of the interference manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The interference manager 715, or its sub-components, may be physically located at various positions, including being distributed such that portions of functions are implemented at different physical locations by one or more physical components. In some examples, the interference manager 715, or its sub-components, may be a separate and distinct component in accordance with various aspects of the present disclosure. In some examples, the interference manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the interference manager 715 may be implemented as an integrated circuit or chipset for a mobile device modem, and the receiver 705 and transmitter 720 may be implemented as analog components (e.g., amplifiers, filters, antennas) coupled with the mobile device modem to enable wireless transmission and reception over one or more bands.

The interference manager 715 as described herein may be implemented to realize one or more potential advantages. One implementation may allow the device 705 to save power and increase battery life by reducing the number of retransmissions caused by interference from a neighboring base station. For example, the device 705 may transmit over the air signaling (e.g., an interference coordination message) to a neighboring base station to request that the neighboring base station modify one or more transmission parameters to reduce interference at the device 705. Another implementation may allow the device 705 to select a narrow receive beam for communications with a serving base station to reduce interference from a neighboring base station.

Based on implementing over the air signaling techniques as described herein, a processor of a UE 115 (e.g., controlling the receiver 710, the transmitter 740, or the transceiver 920 as described with reference to FIG. 9) may reduce interference at the UE 115 and more efficiently utilize system resources at a serving base station and a neighboring base station. Further, the processor of UE 115 may transmit a report indicating potential interfering neighboring base stations and receive control information indicating information for transmission of over the air interference message to a neighboring base station.

Figure 8:
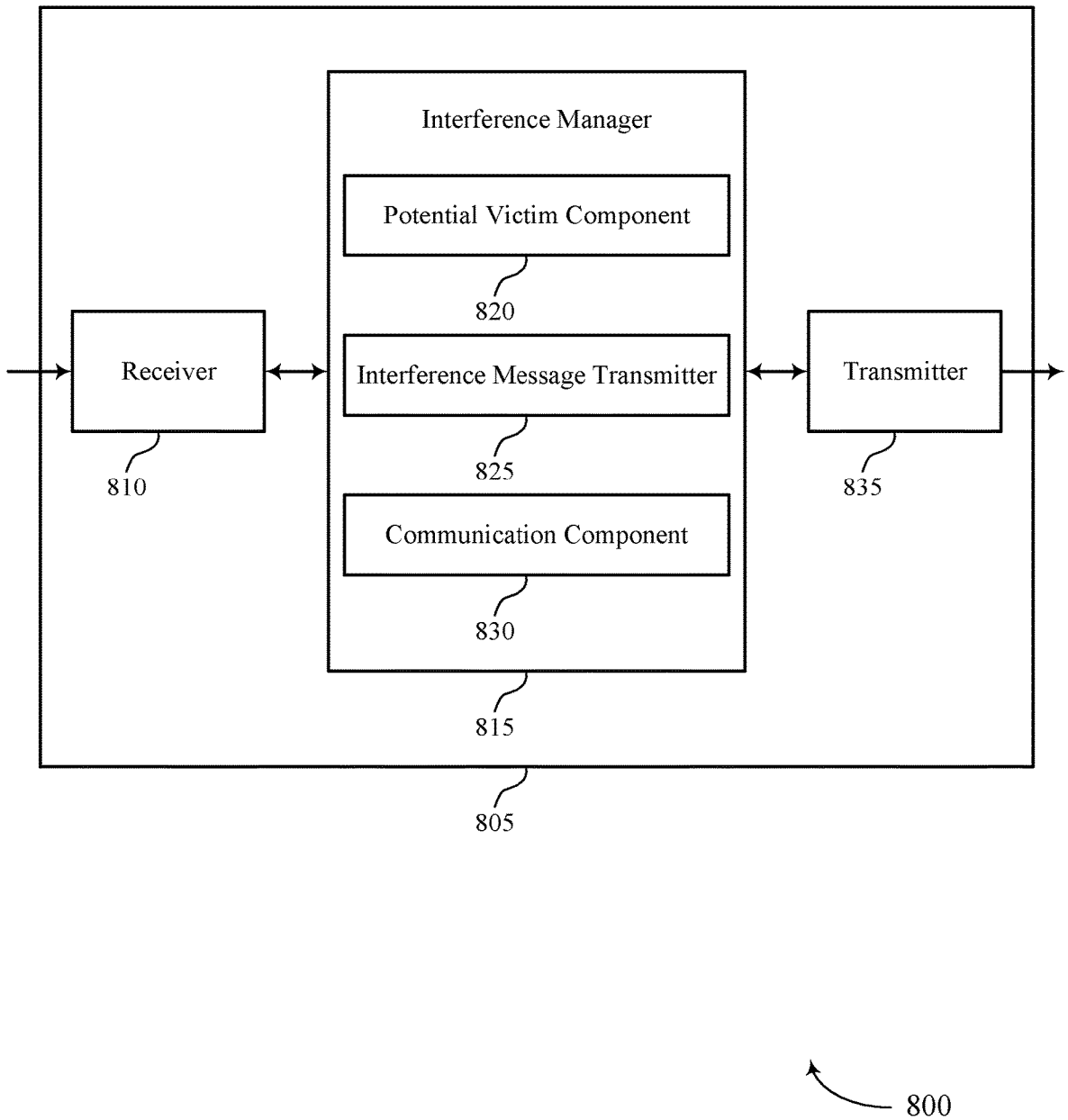

FIG. 8 shows a block diagram 800 of a device 805 that supports over the air interference coordination in accordance with aspects of the present disclosure. The device 805 may be an example of aspects of a device 705, or a UE 115 as described herein. The device 805 may include a receiver 810, an interference manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to over the air interference coordination, etc.). Information may be passed on to other components of the device 805. The receiver 810 may be an example of aspects of the transceiver 1020 described with reference to FIG. 10. The receiver 810 may utilize a single antenna or a set of antennas.

The interference manager 815 may be an example of aspects of the interference manager 715 as described herein. The interference manager 815 may include a potential victim component 820, an interference message transmitter 825, and a communication component 830. The interference manager 815 may be an example of aspects of the interference manager 1010 described herein.

The potential victim component 820 may identify, by the UE in communication with a serving base station, that the UE is a potential victim of interference from a neighboring base station.

The interference message transmitter 825 may transmit an interference coordination message to the neighboring base station based on the identifying, the interference coordination message requesting modification of one or more transmission parameters at the neighboring base station.

The communication component 830 may communicate with the serving base station after transmitting the interference coordination message.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
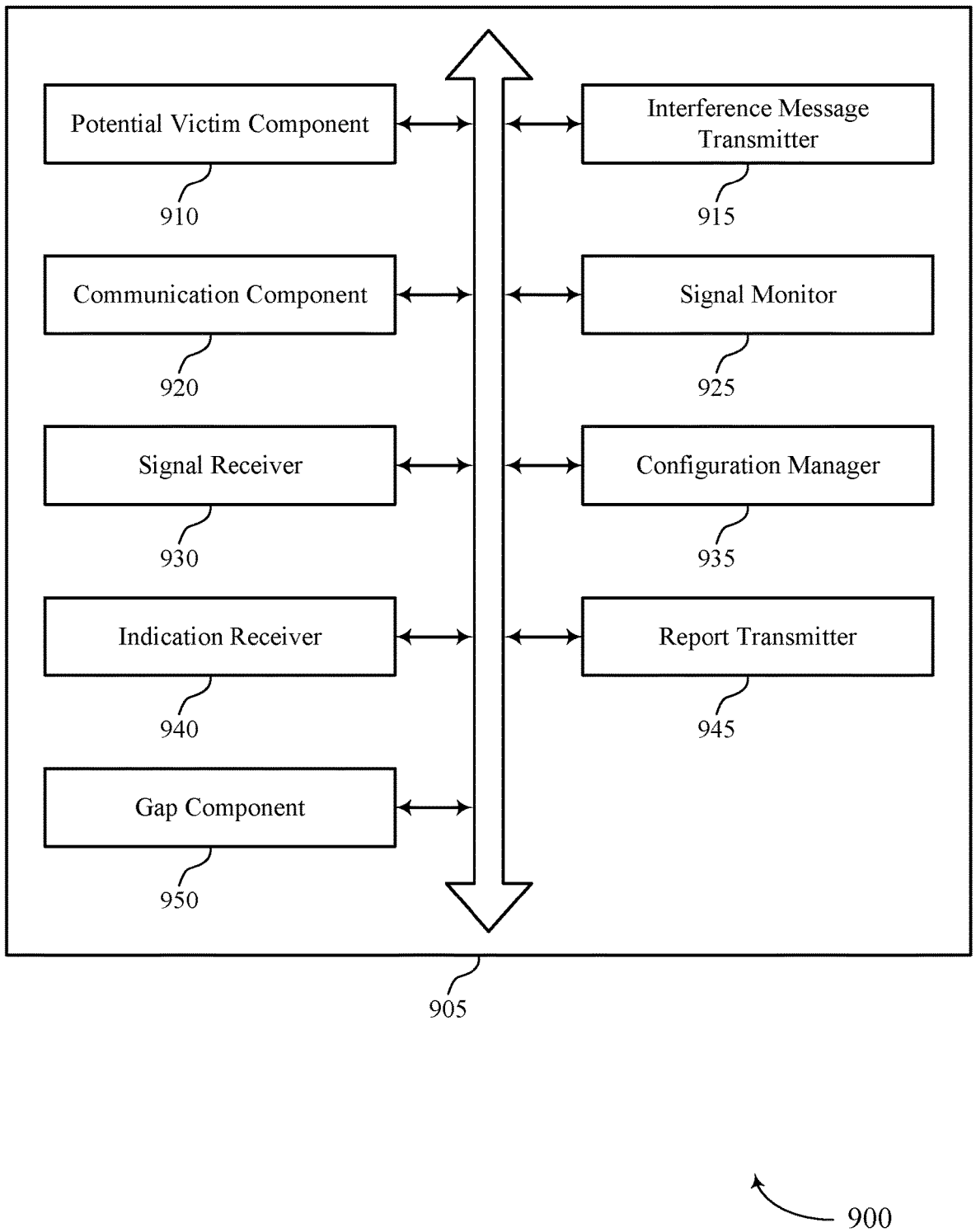
FIG. 9 shows a block diagram of an interference manager that supports over the air interference coordination in accordance with aspects of the present disclosure.

FIG. 9 shows a block diagram 900 of an interference manager 905 that supports over the air interference coordination in accordance with aspects of the present disclosure. The interference manager 905 may be an example of aspects of an interference manager 715, an interference manager 815, or an interference manager 1010 described herein. The interference manager 905 may include a potential victim component 910, an interference message transmitter 915, a communication component 920, a signal monitor 925, a signal receiver 930, a configuration manager 935, an indication receiver 940, a report transmitter 945, and a gap component 950. Each of these modules may communicate, directly or indirectly, with one another (e.g., via one or more buses).

The potential victim component 910 may identify, by the UE in communication with a serving base station, that the UE is a potential victim of interference from a neighboring base station. In some examples, the potential victim component 910 may identify that the UE is the potential victim of interference from the neighboring base station based on the receiving. In some cases, the potential victim component 910 may determine that the UE is a potential victim UE based on the monitoring. In some aspects, the potential victim component 910 may determine that the neighboring base station is a potential interfering base station based on receiving the first and second signals.

The interference message transmitter 915 may transmit an interference coordination message to the neighboring base station based on the identifying, the interference coordination message requesting modification of one or more transmission parameters at the neighboring base station. In some examples, the interference message transmitter 915 may transmit the interference coordination message to the neighboring base station in a direction based on the indication. In some cases, the interference message transmitter 915 may transmit the interference coordination message to the neighboring base station before the downlink shared channel transmission. In some aspects, the interference message transmitter 915 may transmit the interference coordination message via a same beam or a different beam than a beam used for the downlink shared channel transmission. In some instances, the interference message transmitter 915 may transmit the interference coordination message via a transmission beam corresponding to the beam index. In some examples, the interference message transmitter 915 may include an indication of UE priority in the interference coordination message.

The communication component 920 may communicate with the serving base station after transmitting the interference coordination message.

The signal monitor 925 may monitor for signaling from at least one of the serving base station or the neighboring base station using a receive beam of the UE. In some examples, the signal monitor 925 may monitor for signaling from a set of base stations via a set of receive beams, the set of base stations including the serving base station and the neighboring base station. In some cases, the signal monitor 925 may monitor resources allocated for the downlink shared channel transmission according to the gap following transmission of the interference coordination message.

The signal receiver 930 may receive signaling from both the serving base station and the neighboring base station based on the monitoring. In some examples, the signal receiver 930 may receive a first signal from the serving base station via a first receive beam of the set of receive beams based on the monitoring, the first signal associated with a first TCI state or a first SSB of the serving base station. In some cases, the signal receiver 930 may receive a second signal from the neighboring base station via the first receive beam of the set of receive beams based on the monitoring, the second signal associated with a second TCI state or a second SSB of the neighboring base station. In some aspects, the signal receiver 930 may receive a downlink control message from the serving base station, the downlink control message indicating a TCI state for a downlink shared channel transmission. In some instances, the downlink control message indicates resources for the interference coordination message and information to include in the interference coordination message. In some cases, the downlink control message includes DCI carried via a PDCCH.

The configuration manager 935 may configure the UE as a potential victim UE according to a set of UE receive beams, a set of serving base station transmit beams, and a set of neighboring base station transmit beams based on the identifying.

The indication receiver 940 may receive an indication from the serving station to transmit the interference coordination message to the neighboring base station, where the UE is identified as the potential victim based on the indication. In some examples, the indication receiver 940 may receive an indication of a beam index for transmission of the interference coordination message via one of RRC signaling, a MAC-CE, or the downlink control message.

The report transmitter 945 may transmit a report to the serving base station based on determining that the neighboring base station is the potential interfering base station, the report indicating information related to the neighboring base station, the first TCI state, the second TCI state, the first SSB, the second SSB, the first receive beam, or any combination thereof. In some cases, the report is transmitted via RRC signaling.

The gap component 950 may identify a gap between transmission of the interference coordination message and the downlink shared channel transmission. In some examples, the gap component 950 may receive an indication of the gap from the serving base station via one of RRC signaling, a MAC-CE, or the downlink control message. In some cases, the gap is common to the serving base station and the neighboring base station. In some aspects, the gap is preconfigured at the UE, the serving base station, and the neighboring base station.

Figure 10:
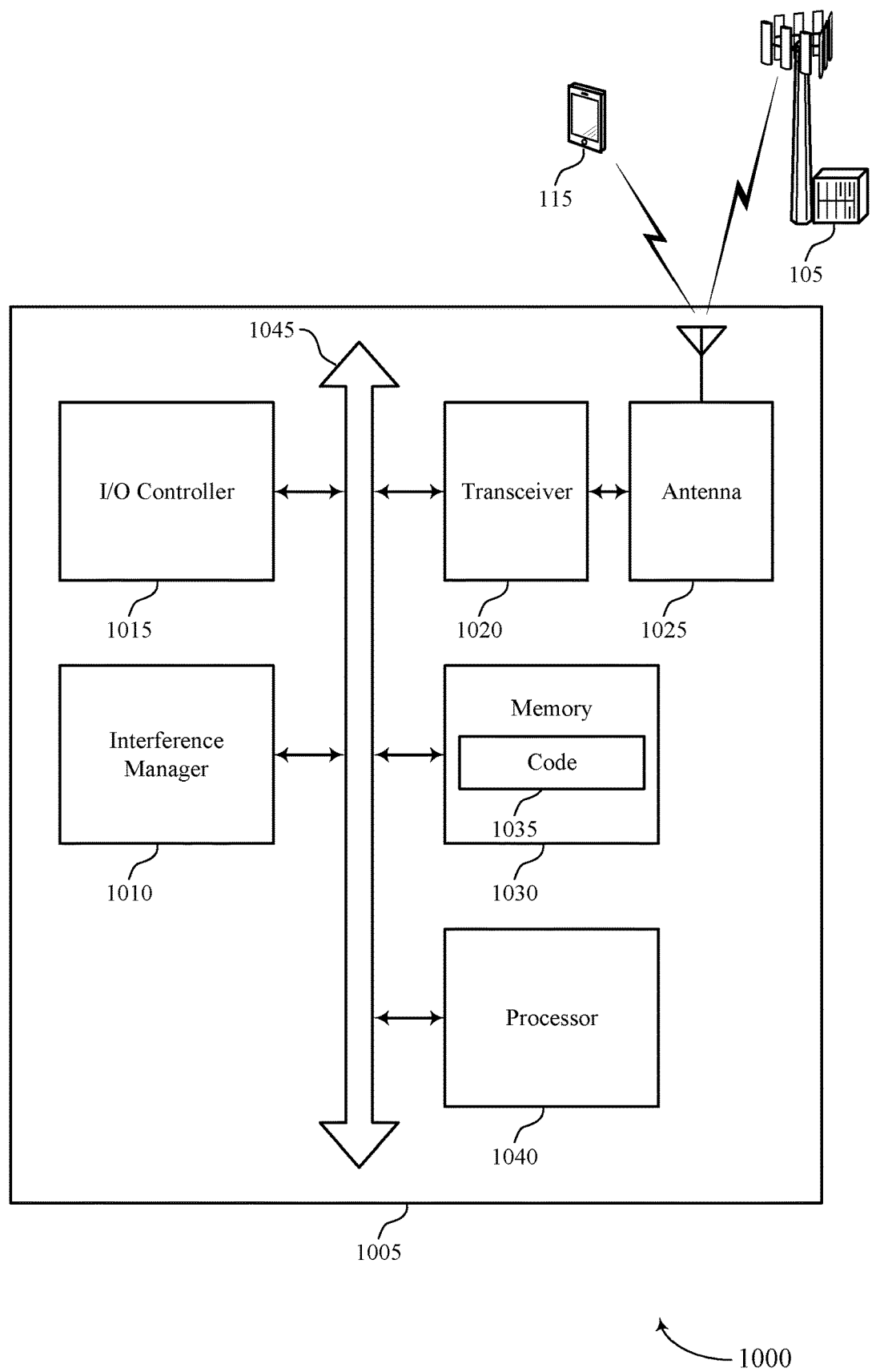
FIG. 10 shows a diagram of a system including a device that supports over the air interference coordination in accordance with aspects of the present disclosure.

FIG. 10 shows a diagram of a system 1000 including a device 1005 that supports over the air interference coordination in accordance with aspects of the present disclosure. The device 1005 may be an example of or include the components of device 705, device 805, or a UE 115 as described herein. The device 1005 may include components for bi-directional voice and data communications including components for transmitting and receiving communications, including an interference manager 1010, an I/O controller 1015, a transceiver 1020, an antenna 1025, memory 1030, and a processor 1040. These components may be in electronic communication via one or more buses (e.g., bus 1045).

The interference manager 1010 may identify, by the UE in communication with a serving base station, that the UE is a potential victim of interference from a neighboring base station, transmit an interference coordination message to the neighboring base station based on the identifying, the interference coordination message requesting modification of one or more transmission parameters at the neighboring base station, and communicate with the serving base station after transmitting the interference coordination message.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the device 1025 may include a single antenna 1025, or the device 1025 may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting over the air interference coordination).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
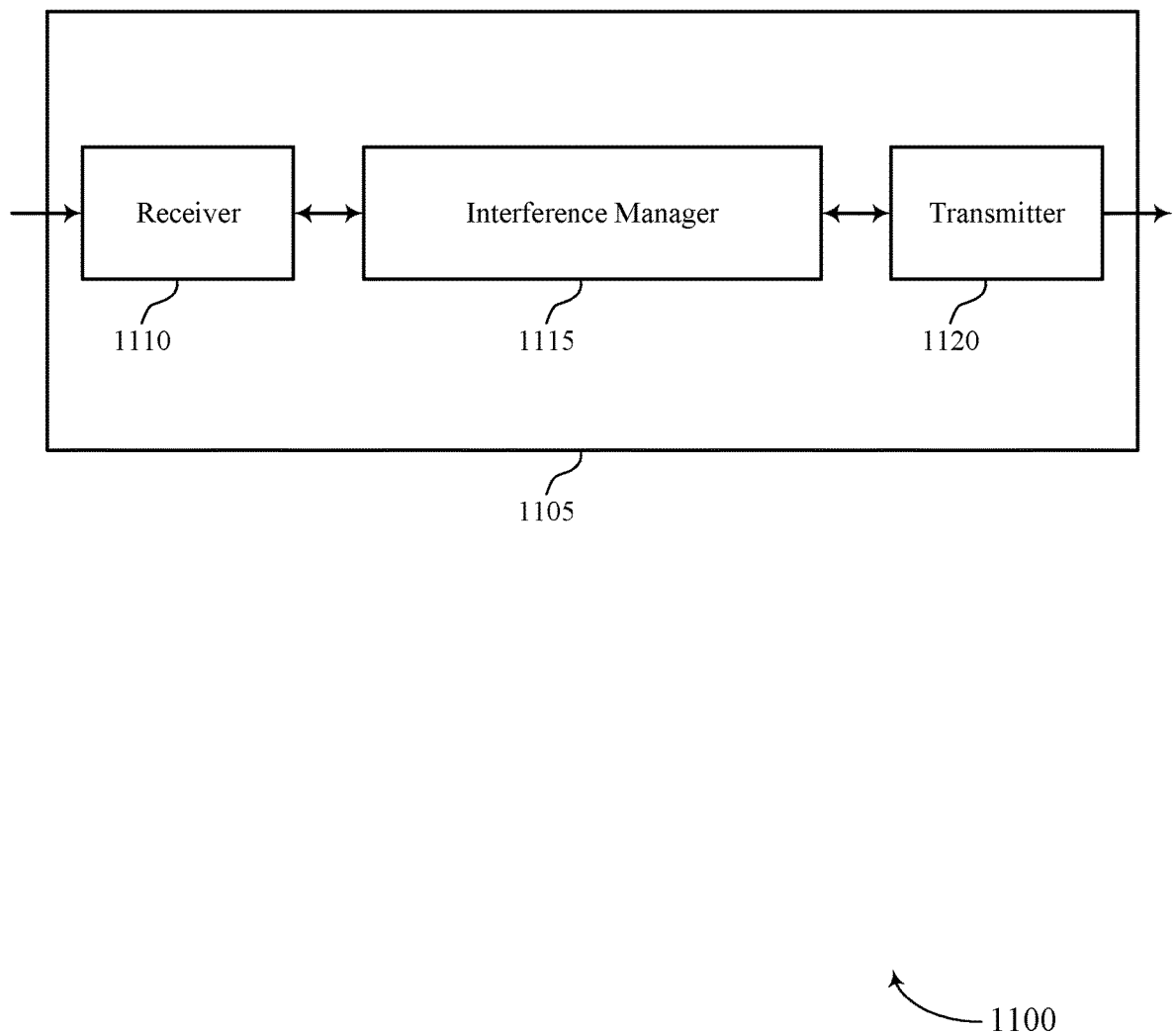
FIGS. 11 and 12 show block diagrams of devices that support over the air interference coordination in accordance with aspects of the present disclosure.

FIG. 11 shows a block diagram 1100 of a device 1105 that supports over the air interference coordination in accordance with aspects of the present disclosure. The device 1105 may be an example of aspects of a base station 105 as described herein. The device 1105 may include a receiver 1110, an interference manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to over the air interference coordination, etc.). Information may be passed on to other components of the device 1105. The receiver 1110 may be an example of aspects of the transceiver 1420 described with reference to FIG. 14. The receiver 1110 may utilize a single antenna or a set of antennas.

The interference manager 1115 may identify that a UE in communication with the serving base station is a potential victim of interference from a neighboring base station and transmit a downlink control message to the UE indicating that the UE is a potential victim UE based on the identifying. The interference manager 1115 may also identify that the neighboring base station is a potential interfering base station for a UE in communication with a serving base station and monitor for an interference coordination message from the UE based on the identifying. The interference manager 1115 may be an example of aspects of the interference manager 1410 described herein.

The interference manager 1115, or its sub-components, may be implemented in hardware, code (e.g., software or firmware) executed by a processor, or any combination thereof. If implemented in code executed by a processor, the functions of the interference manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The interference manager 1115, or its sub-components, may be physically located at various positions, including being distributed such that portions of functions are implemented at different physical locations by one or more physical components. In some examples, the interference manager 1115, or its sub-components, may be a separate and distinct component in accordance with various aspects of the present disclosure. In some examples, the interference manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
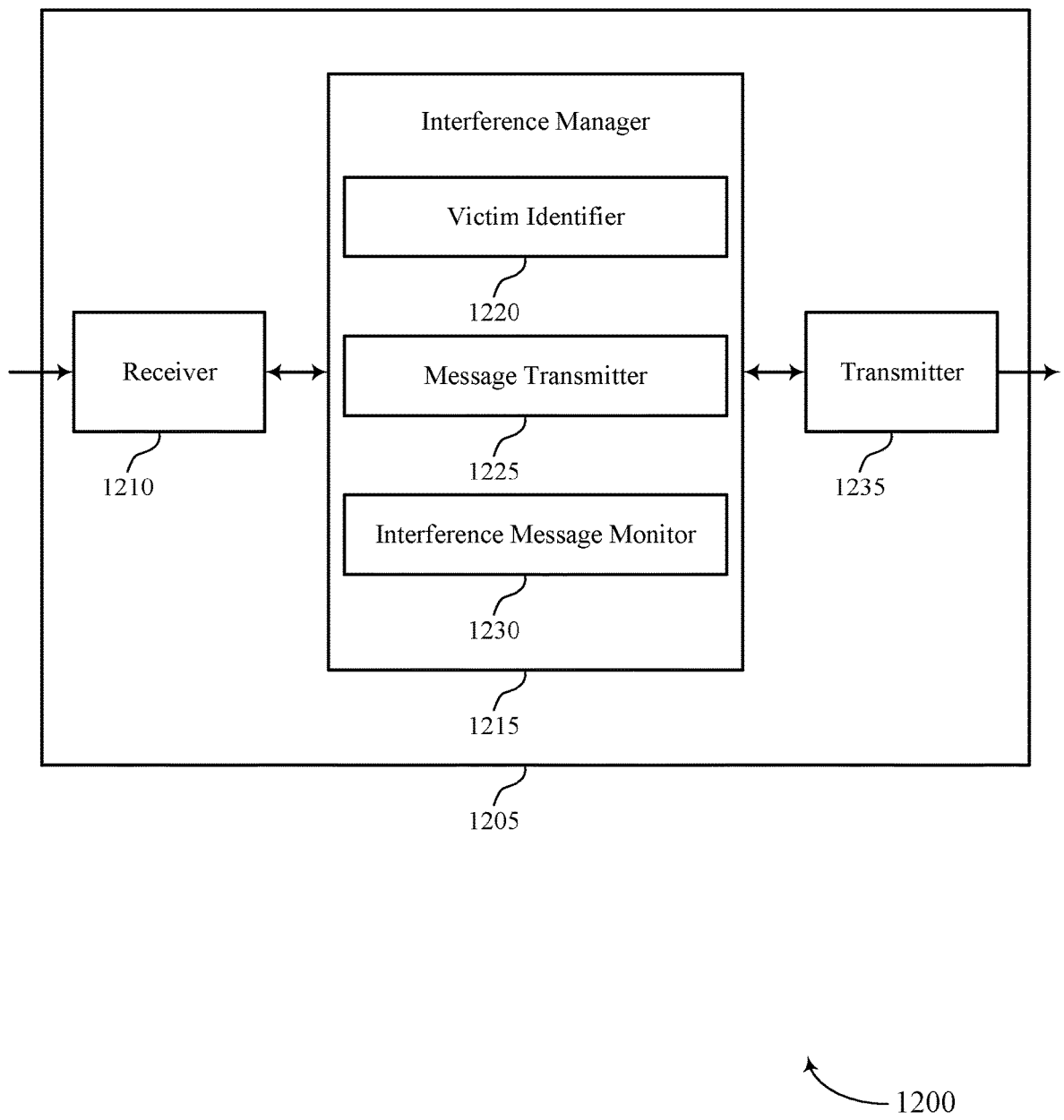

FIG. 12 shows a block diagram 1200 of a device 1205 that supports over the air interference coordination in accordance with aspects of the present disclosure. The device 1205 may be an example of aspects of a device 1105, or a base station 105 as described herein. The device 1205 may include a receiver 1210, an interference manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to over the air interference coordination, etc.). Information may be passed on to other components of the device 1205. The receiver 1210 may be an example of aspects of the transceiver 1420 described with reference to FIG. 14. The receiver 1210 may utilize a single antenna or a set of antennas.

The interference manager 1215 may be an example of aspects of the interference manager 1115 as described herein. The interference manager 1215 may include a victim identifier 1220, a message transmitter 1225, and an interference message monitor 1230. The interference manager 1215 may be an example of aspects of the interference manager 1410 described herein.

The victim identifier 1220 may identify that a UE in communication with the serving base station is a potential victim of interference from a neighboring base station.

The message transmitter 1225 may transmit a downlink control message to the UE indicating that the UE is a potential victim UE based on the identifying.

The victim identifier 1220 may identify that the neighboring base station is a potential interfering base station for a UE in communication with a serving base station.

The interference message monitor 1230 may monitor for an interference coordination message from the UE based on the identifying.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
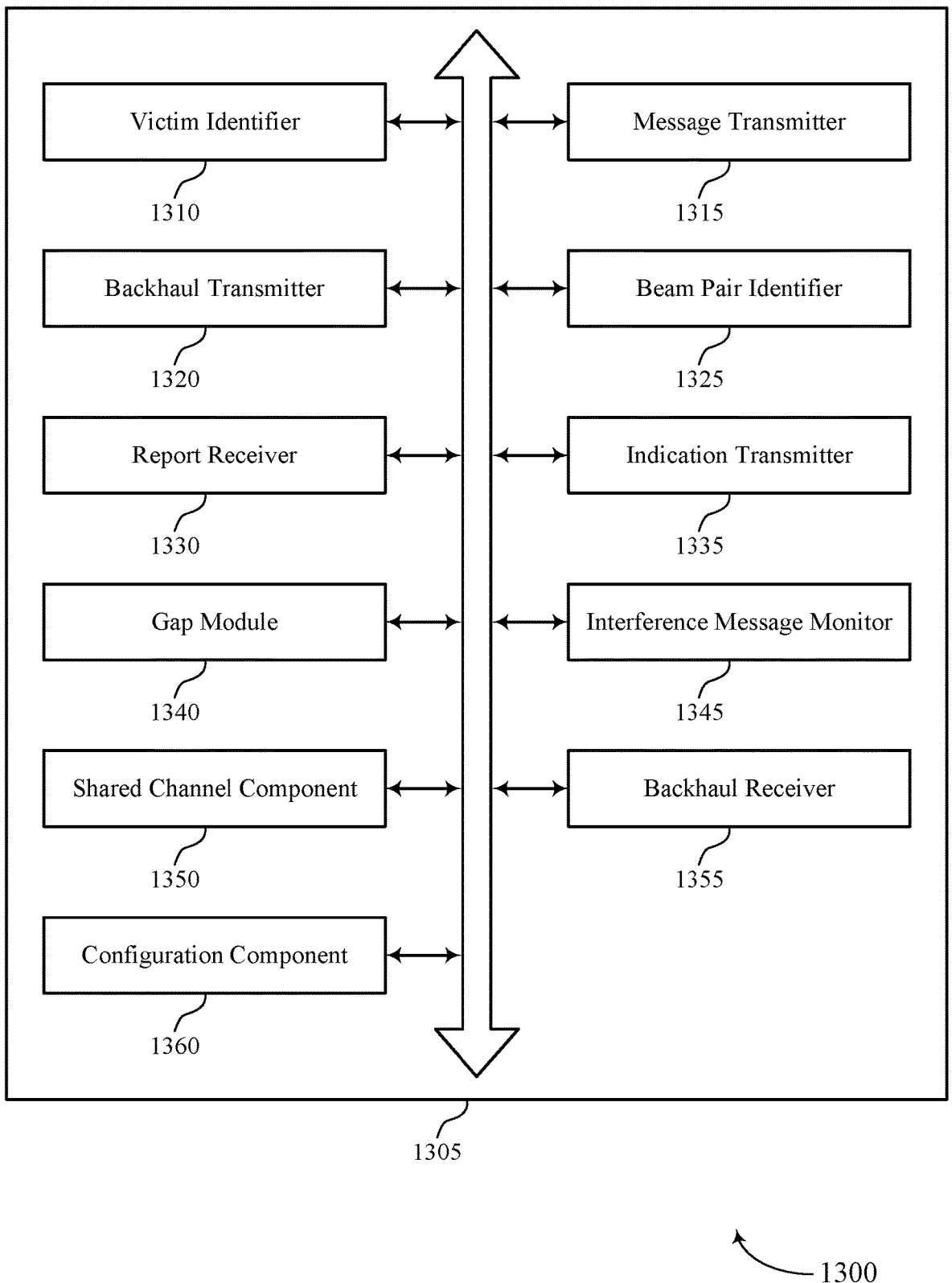
FIG. 13 shows a block diagram of an interference manager that supports over the air interference coordination in accordance with aspects of the present disclosure.

FIG. 13 shows a block diagram 1300 of an interference manager 1305 that supports over the air interference coordination in accordance with aspects of the present disclosure. The interference manager 1305 may be an example of aspects of an interference manager 1115, an interference manager 1215, or an interference manager 1410 described herein. The interference manager 1305 may include a victim identifier 1310, a message transmitter 1315, a backhaul transmitter 1320, a beam pair identifier 1325, a report receiver 1330, an indication transmitter 1335, a gap module 1340, an interference message monitor 1345, a shared channel component 1350, a backhaul receiver 1355, and a configuration component 1360. Each of these modules may communicate, directly or indirectly, with one another (e.g., via one or more buses).

The victim identifier 1310 may identify that a UE in communication with the serving base station is a potential victim of interference from a neighboring base station. In some examples, the victim identifier 1310 may identify that the neighboring base station is a potential interfering base station for a UE in communication with a serving base station. In some cases, the victim identifier 1310 may determine that the neighboring base station is a potential interfering base station based on the identifying. In some aspects, the victim identifier 1310 may identify that the UE is the potential victim of interference from the neighboring base station based on the set of beam pairs. In some instances, the victim identifier 1310 may identify that the UE is the potential victim of interference from the neighboring base station based on the report.

The message transmitter 1315 may transmit a downlink control message to the UE indicating that the UE is a potential victim UE based on the identifying. In some cases, the downlink control message indicates a TCI state for a downlink shared channel transmission to the UE, resources for an interference coordination message from the UE, information to include in the interference coordination message, an indication for the UE to transmit the interference coordination message to the neighboring base station, or any combination thereof. In some aspects, the information to include in the interference coordination message includes a set of time-frequency resources allocated for transmission of the interference coordination message, transmission timing for the interference coordination message, an uplink transmission beam index for the interference coordination message, or any combination thereof.

The interference message monitor 1345 may monitor for an interference coordination message from the UE based on the identifying. In some examples, the interference message monitor 1345 may monitor for the interference coordination message using the interfering transmission beam. In some cases, the interference message monitor 1345 may receive the interference coordination message from the UE based on the monitoring, where the interference coordination message is received via a same or different beam than a beam for a downlink shared channel transmission for a second UE in communication with the neighboring base station. In some aspects, the interference message monitor 1345 may receive the interference coordination message from the UE based on the monitoring. In some instances, the interference coordination message indicates the priority level of the UE.

The backhaul transmitter 1320 may transmit a backhaul message to the neighboring base station to configure the neighboring base station as the potential interfering base station based on the determining. In some examples, transmitting a backhaul message to the neighboring base station indicating that the neighboring base station is a potential interfering base station based on the report, where the backhaul message includes an indication of the potential victim UE and information related to the second TCI state, the second SSB, the serving base station, a transmission beam associated with the second TCI state or the second SSB, or any combination thereof. In some cases, the backhaul transmitter 1320 may transmit a backhaul message to the neighboring base station indicating the gap.

The beam pair identifier 1325 may identify a set of beam pairs associated with the UE, the serving base station, and the neighboring base station.

The report receiver 1330 may receive a report from the UE, the report indicating information related to the neighboring base station, a first TCI state of a first signal associated with the serving base station, a first SSB of the first signal associated with the serving base station, a second TCI state of a second signal associated with the neighboring base station, a second SSB of the second signal associated with the neighboring base station, a receive beam of the UE, or any combination thereof.

The indication transmitter 1335 may transmit an indication of a beam index for transmission of an interference coordination message via one of RRC signaling, a MAC-CE, or DCI, where the beam index is a same or different index than a beam used for reception of the downlink shared channel transmission. In some examples, the indication transmitter 1335 may transmit an indication of a gap to the UE via one of RRC signaling, a MAC control element (MAC-CE), or DCI, where the gap is common to the serving base station and the neighboring base station and indicates a delay between transmission of an interference coordination message and a downlink shared channel transmission.

The gap module 1340 may receive an indication of a gap from the serving base station, where the gap is common to the serving base station and the neighboring base station and indicates a delay between transmission of the interference coordination message and a downlink shared channel transmission for a second UE in communication with the neighboring base station. In some examples, the gap module 1340 may identify a gap that indicates a delay between transmission of the interference coordination message and a downlink shared channel transmission for a second UE in communication with the neighboring base station, where the gap is a fixed value preconfigured at the serving base station, the UE, and the neighboring base station. In some cases, a gap between an interference coordination message from the UE and a downlink shared channel transmission from the neighboring base station is a default value configured at the serving base station, the UE, and the neighboring base station.

The shared channel component 1350 may identify a downlink shared channel transmission for a second UE in communication with the neighboring base station. In some examples, the shared channel component 1350 may determine whether to transmit the downlink shared channel transmission based on the monitoring. In some aspects, the shared channel component 1350 may transmit the downlink shared channel transmission to the second UE based on an absence of the interference coordination message using the interfering transmission beam during the monitoring. In some cases, the shared channel component 1350 may refrain from transmitting the downlink shared channel transmission to the second UE based on detecting the interference coordination message using the interfering transmission beam during the monitoring. In some instances, the shared channel component 1350 may transmit DCI to a second UE in communication with the neighboring base station, the DCI indicating cancellation of a downlink shared channel transmission for the second UE based on receiving the interference coordination message. In some examples, the shared channel component 1350 may refrain from transmitting a downlink shared channel transmission to a second UE in communication with the neighboring base station based on receiving the interference coordination message. In some cases, the shared channel component 1350 may transmit a downlink shared channel transmission to a second UE in communication with the neighboring base station based on a priority level of the UE being lower than the neighboring base station.

The backhaul receiver 1355 may receive a backhaul message from the serving base station to configure the neighboring base station as the potential interfering base station based on the determining. In some examples, the backhaul receiver 1355 may receive a backhaul message from the serving base station indicating the UE as a potential victim UE, the backhaul message including an indication of an interfering transmission beam for the neighboring base station, an interfering TCI state for the neighboring base station, an interfering SSB for the neighboring base station, or any combination thereof. In some cases, the backhaul receiver 1355 may receive a backhaul message from the serving base station indicating the priority level of the UE.

The configuration component 1360 may configure the neighboring base station as the potential interfering base station based on the backhaul message.

Figure 14:
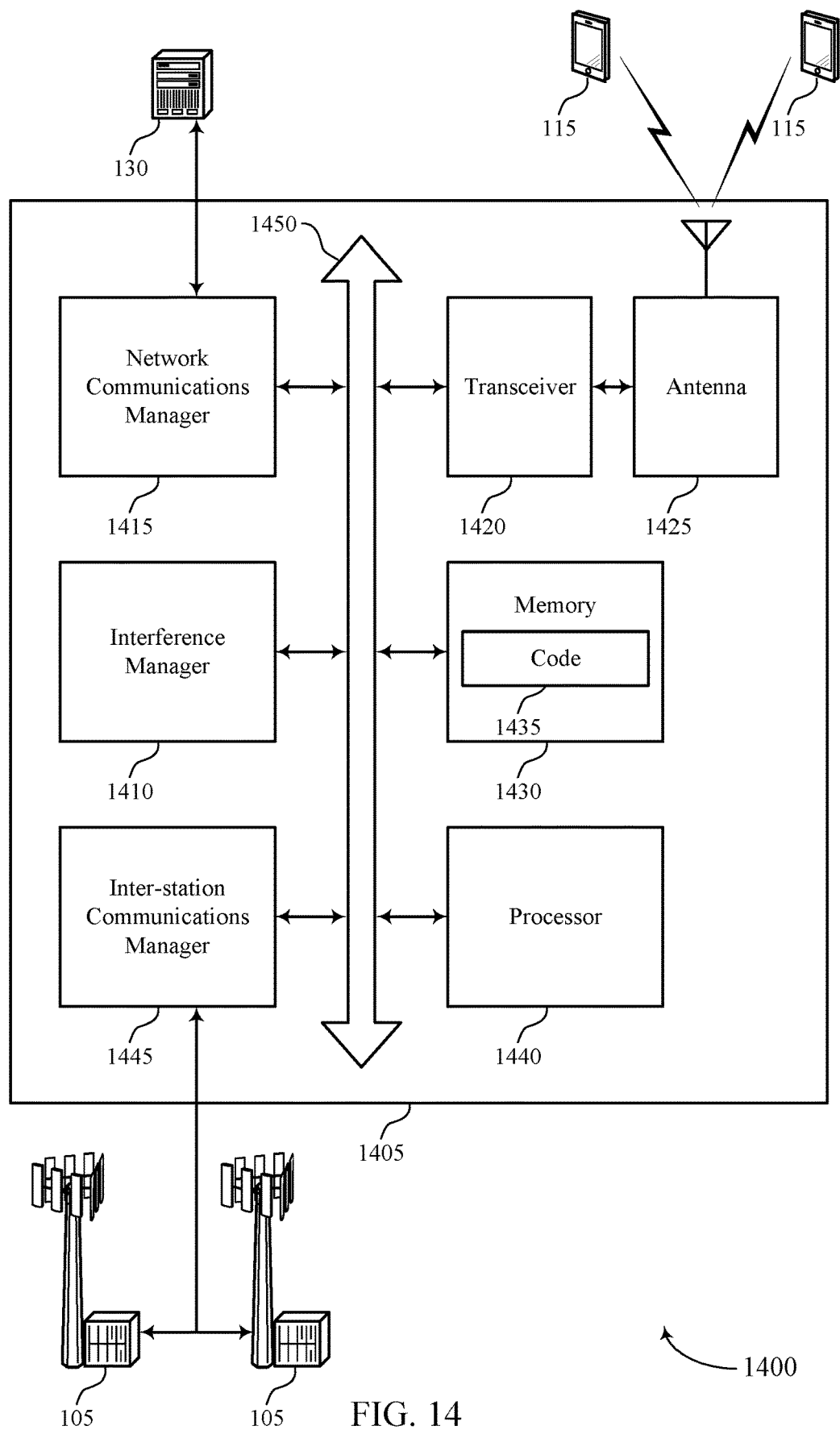
FIG. 14 shows a diagram of a system including a device that supports over the air interference coordination in accordance with aspects of the present disclosure.

FIG. 14 shows a diagram of a system 1400 including a device 1405 that supports over the air interference coordination in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including an interference manager 1410, a network communications manager 1415, a transceiver 1420, an antenna 1425, memory 1430, a processor 1440, and an inter-station communications manager 1445. These components may be in electronic communication via one or more buses (e.g., bus 1450).

The interference manager 1410 may identify that a UE in communication with the serving base station is a potential victim of interference from a neighboring base station and transmit a downlink control message to the UE indicating that the UE is a potential victim UE based on the identifying. The interference manager 1410 may also identify that the neighboring base station is a potential interfering base station for a UE in communication with a serving base station and monitor for an interference coordination message from the UE based on the identifying.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the device 1425 may include a single antenna 1425, or the device 1425 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting over the air interference coordination).

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
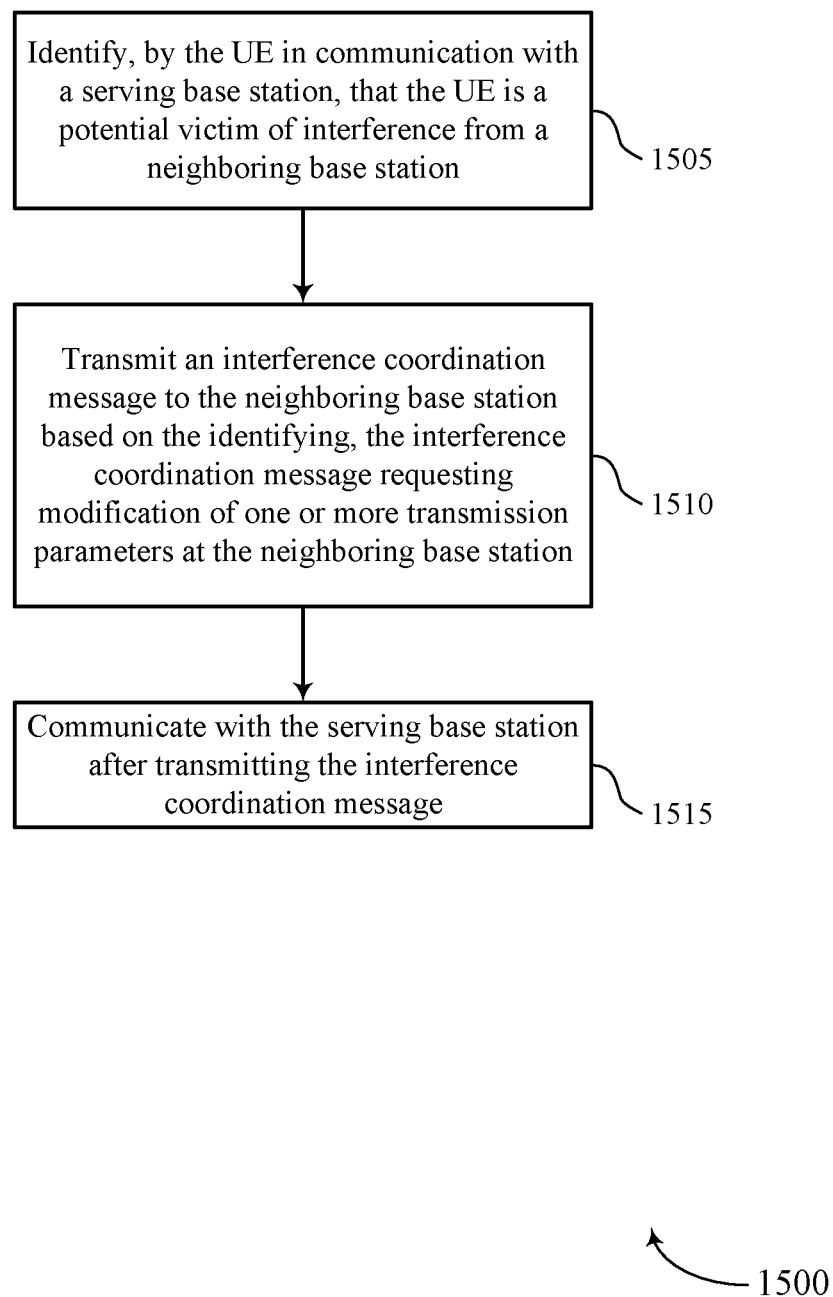
FIGS. 15 through 25 show flowcharts illustrating methods that support over the air interference coordination in accordance with aspects of the present disclosure.

FIG. 15 shows a flowchart illustrating a method 1500 that supports over the air interference coordination in accordance with aspects of the present disclosure. The operations of method 1500 may be implemented by a UE 115 or its components as described herein. For example, the operations of method 1500 may be performed by an interference manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may identify, by the UE in communication with a serving base station, that the UE is a potential victim of interference from a neighboring base station. The operations of 1505 may be performed according to the methods described herein. In some examples, aspects of the operations of 1505 may be performed by a potential victim component as described with reference to FIGS. 7 through 10.

At 1510, the UE may transmit an interference coordination message to the neighboring base station based on the identifying, the interference coordination message requesting modification of one or more transmission parameters at the neighboring base station. The operations of 1510 may be performed according to the methods described herein. In some examples, aspects of the operations of 1510 may be performed by an interference message transmitter as described with reference to FIGS. 7 through 10.

At 1515, the UE may communicate with the serving base station after transmitting the interference coordination message. The operations of 1515 may be performed according to the methods described herein. In some examples, aspects of the operations of 1515 may be performed by a communication component as described with reference to FIGS. 7 through 10.

Figure 16:
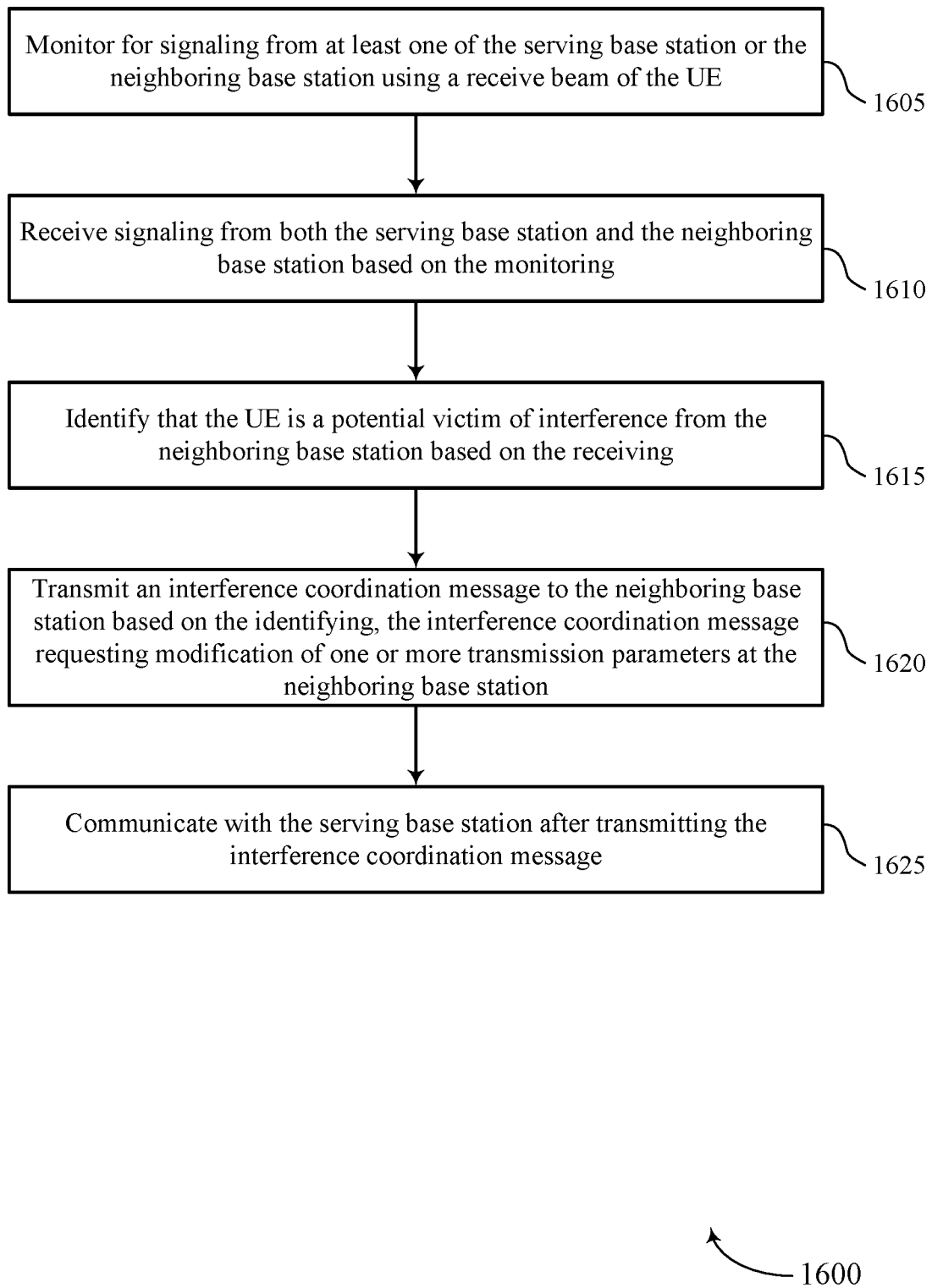

FIG. 16 shows a flowchart illustrating a method 1600 that supports over the air interference coordination in accordance with aspects of the present disclosure. The operations of method 1600 may be implemented by a UE 115 or its components as described herein. For example, the operations of method 1600 may be performed by an interference manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may monitor for signaling from at least one of the serving base station or the neighboring base station using a receive beam of the UE. The operations of 1605 may be performed according to the methods described herein. In some examples, aspects of the operations of 1605 may be performed by a signal monitor as described with reference to FIGS. 7 through 10.

At 1610, the UE may receive signaling from both the serving base station and the neighboring base station based on the monitoring. The operations of 1610 may be performed according to the methods described herein. In some examples, aspects of the operations of 1610 may be performed by a signal receiver as described with reference to FIGS. 7 through 10.

At 1615, the UE may identify that the UE is the potential victim of interference from the neighboring base station based on the receiving. The operations of 1615 may be performed according to the methods described herein. In some examples, aspects of the operations of 1615 may be performed by a potential victim component as described with reference to FIGS. 7 through 10.

At 1620, the UE may transmit an interference coordination message to the neighboring base station based on the identifying, the interference coordination message requesting modification of one or more transmission parameters at the neighboring base station. The operations of 1620 may be performed according to the methods described herein. In some examples, aspects of the operations of 1620 may be performed by an interference message transmitter as described with reference to FIGS. 7 through 10.

At 1625, the UE may communicate with the serving base station after transmitting the interference coordination message. The operations of 1625 may be performed according to the methods described herein. In some examples, aspects of the operations of 1625 may be performed by a communication component as described with reference to FIGS. 7 through 10.

Figure 17:
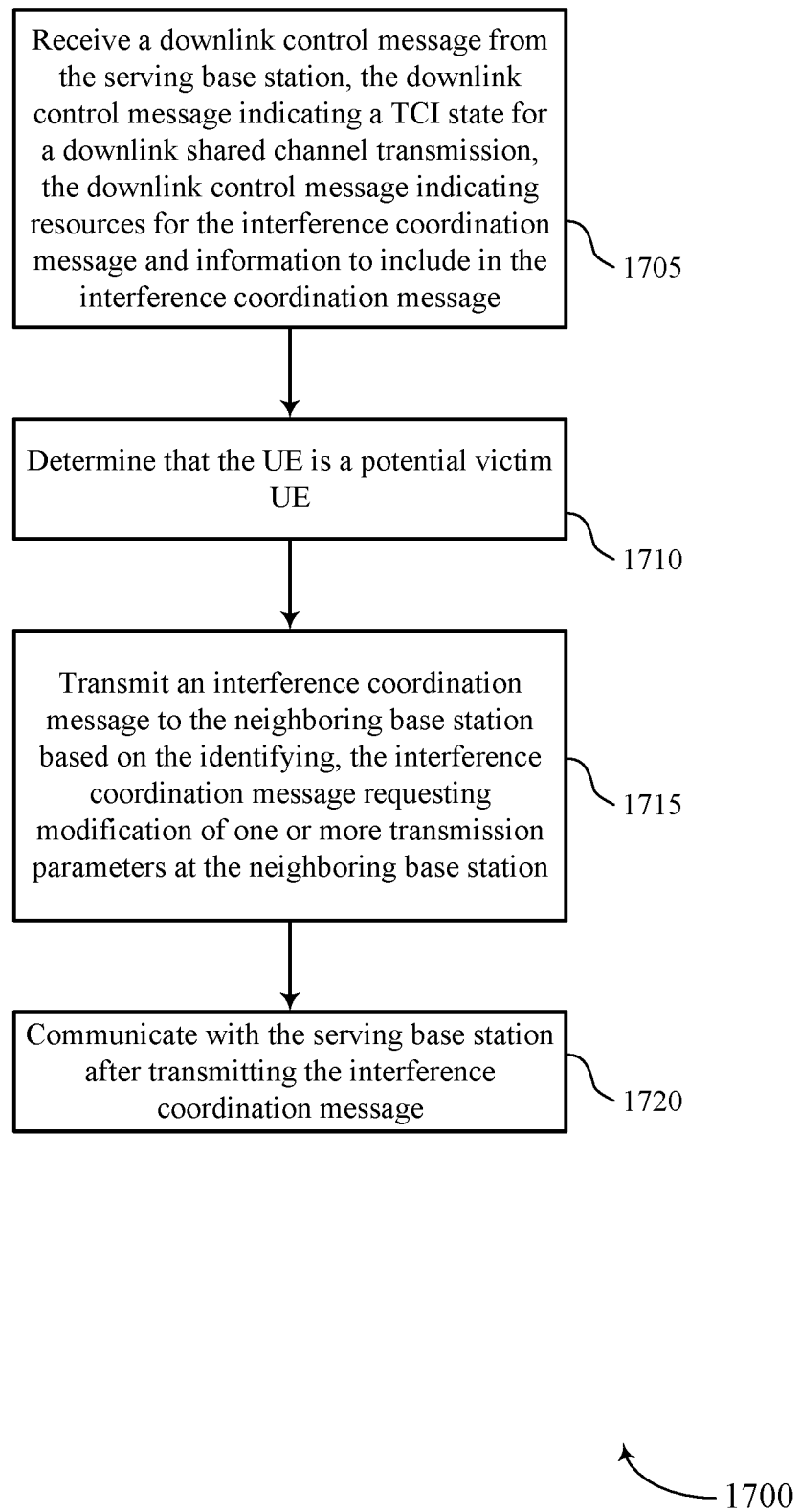

FIG. 17 shows a flowchart illustrating a method 1700 that supports over the air interference coordination in accordance with aspects of the present disclosure. The operations of method 1700 may be implemented by a UE 115 or its components as described herein. For example, the operations of method 1700 may be performed by an interference manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE may receive a downlink control message from the serving base station, the downlink control message indicating a TCI state for a downlink shared channel transmission, the downlink control message indicating resources for the interference coordination message and information to include in the interference coordination message. The operations of 1705 may be performed according to the methods described herein. In some examples, aspects of the operations of 1705 may be performed by a signal receiver as described with reference to FIGS. 7 through 10.

At 1710, the UE may determine that the UE is a potential victim UE. The operations of 1710 may be performed according to the methods described herein. In some examples, aspects of the operations of 1710 may be performed by a potential victim component as described with reference to FIGS. 7 through 10.

At 1715, the UE may transmit an interference coordination message to the neighboring base station based on the identifying, the interference coordination message requesting modification of one or more transmission parameters at the neighboring base station. The operations of 1715 may be performed according to the methods described herein. In some examples, aspects of the operations of 1715 may be performed by an interference message transmitter as described with reference to FIGS. 7 through 10.

At 1720, the UE may communicate with the serving base station after transmitting the interference coordination message. The operations of 1720 may be performed according to the methods described herein. In some examples, aspects of the operations of 1720 may be performed by a communication component as described with reference to FIGS. 7 through 10.

Figure 18:
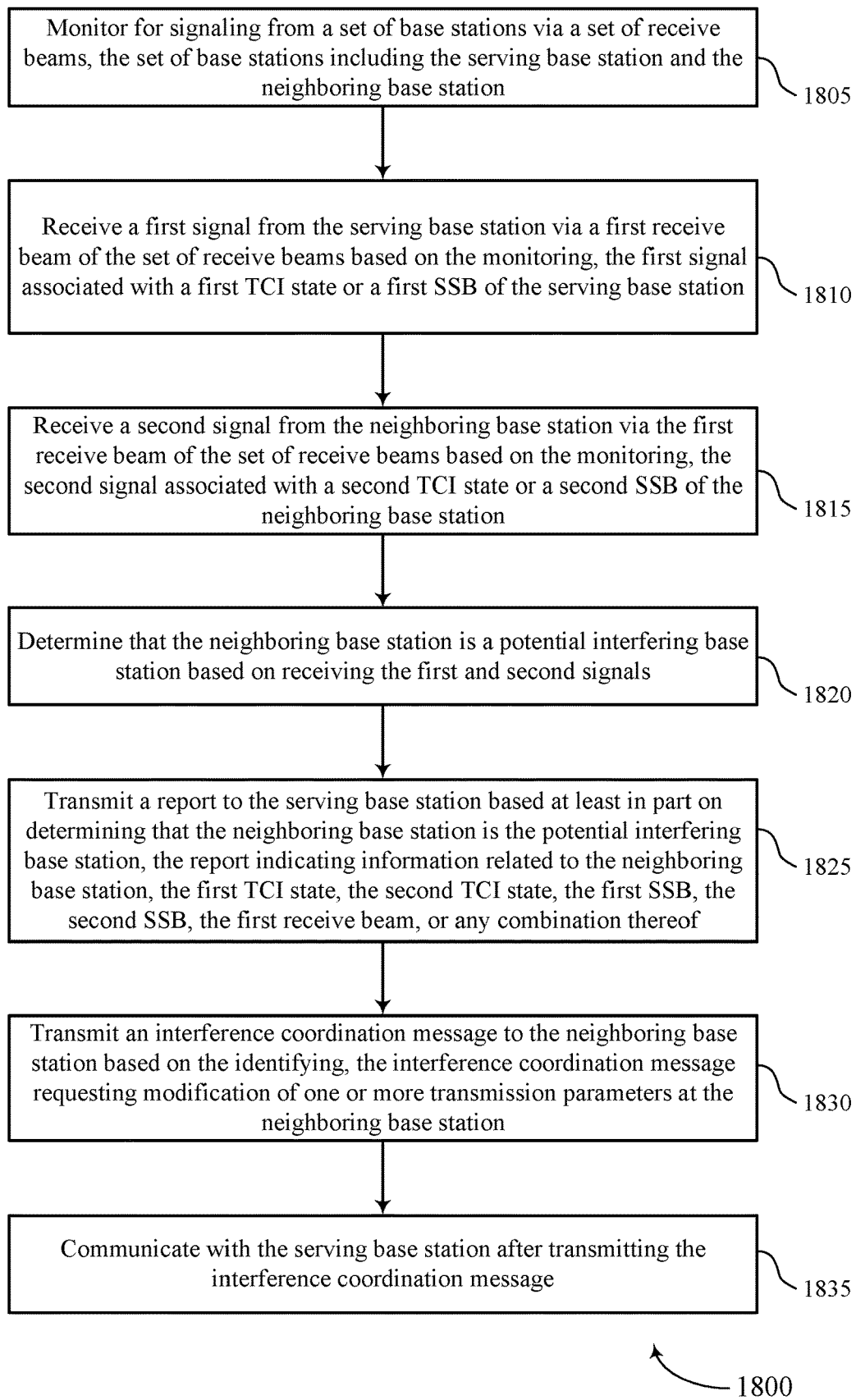

FIG. 18 shows a flowchart illustrating a method 1800 that supports over the air interference coordination in accordance with aspects of the present disclosure. The operations of method 1800 may be implemented by a UE 115 or its components as described herein. For example, the operations of method 1800 may be performed by an interference manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1805, the UE may monitor for signaling from a set of base stations via a set of receive beams, the set of base stations including the serving base station and the neighboring base station. The operations of 1805 may be performed according to the methods described herein. In some examples, aspects of the operations of 1805 may be performed by a signal monitor as described with reference to FIGS. 7 through 10.

At 1810, the UE may receive a first signal from the serving base station via a first receive beam of the set of receive beams based on the monitoring, the first signal associated with a first TCI state or a first SSB of the serving base station. The operations of 1810 may be performed according to the methods described herein. In some examples, aspects of the operations of 1810 may be performed by a signal receiver as described with reference to FIGS. 7 through 10.

At 1815, the UE may receive a second signal from the neighboring base station via the first receive beam of the set of receive beams based on the monitoring, the second signal associated with a second TCI state or a second SSB of the neighboring base station. The operations of 1815 may be performed according to the methods described herein. In some examples, aspects of the operations of 1815 may be performed by a signal receiver as described with reference to FIGS. 7 through 10.

At 1820, the UE may determine the neighboring base station is a potential interfering base station based on receiving the first and second signals. The operations of 1820 may be performed according to the methods described herein. In some examples, aspects of the operations of 1820 may be performed by a potential victim component as described with reference to FIGS. 7 through 10.

At 1825, the UE may transmit a report to the serving base station based at least in part on determining that the neighboring base station is the potential interfering base station, the report indicating information related to the neighboring base station, the first TCI state, the second TCI state, the first SSB, the second SSB, the first receive beam, or any combination thereof. The operations of 1825 may be performed according to the methods described herein. In some examples, aspects of the operations of 1825 may be performed by a report transmitter as described with reference to FIGS. 7 through 10.

At 1830, the UE may transmit an interference coordination message to the neighboring base station based on the identifying, the interference coordination message requesting modification of one or more transmission parameters at the neighboring base station. The operations of 1830 may be performed according to the methods described herein. In some examples, aspects of the operations of 1830 may be performed by an interference message transmitter as described with reference to FIGS. 7 through 10.

At 1835, the UE may communicate with the serving base station after transmitting the interference coordination message. The operations of 1835 may be performed according to the methods described herein. In some examples, aspects of the operations of 1835 may be performed by a communication component as described with reference to FIGS. 7 through 10.

Figure 19:
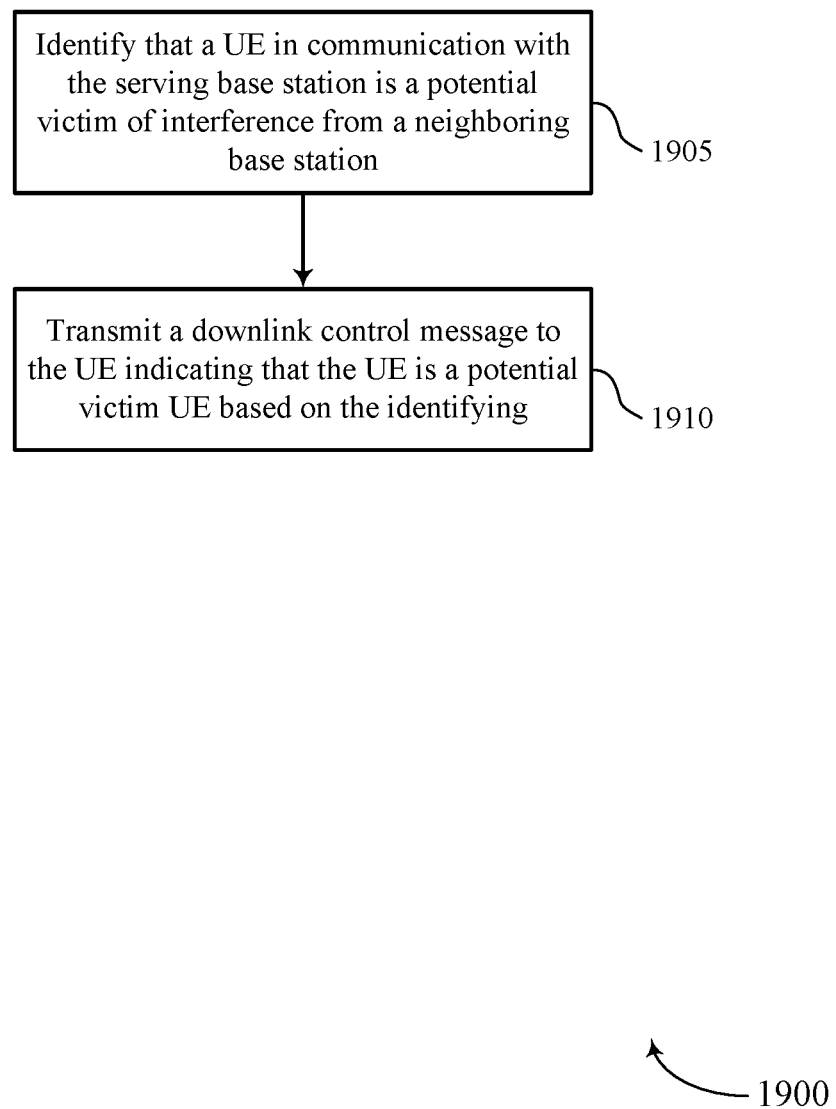

FIG. 19 shows a flowchart illustrating a method 1900 that supports over the air interference coordination in accordance with aspects of the present disclosure. The operations of method 1900 may be implemented by a base station 105 or its components as described herein. For example, the operations of method 1900 may be performed by an interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1905, the base station may identify that a UE in communication with the serving base station is a potential victim of interference from a neighboring base station. The operations of 1905 may be performed according to the methods described herein. In some examples, aspects of the operations of 1905 may be performed by a victim identifier as described with reference to FIGS. 11 through 14.

At 1910, the base station may transmit a downlink control message to the UE indicating that the UE is a potential victim UE based on the identifying. The operations of 1910 may be performed according to the methods described herein. In some examples, aspects of the operations of 1910 may be performed by a message transmitter as described with reference to FIGS. 11 through 14.

Figure 20:
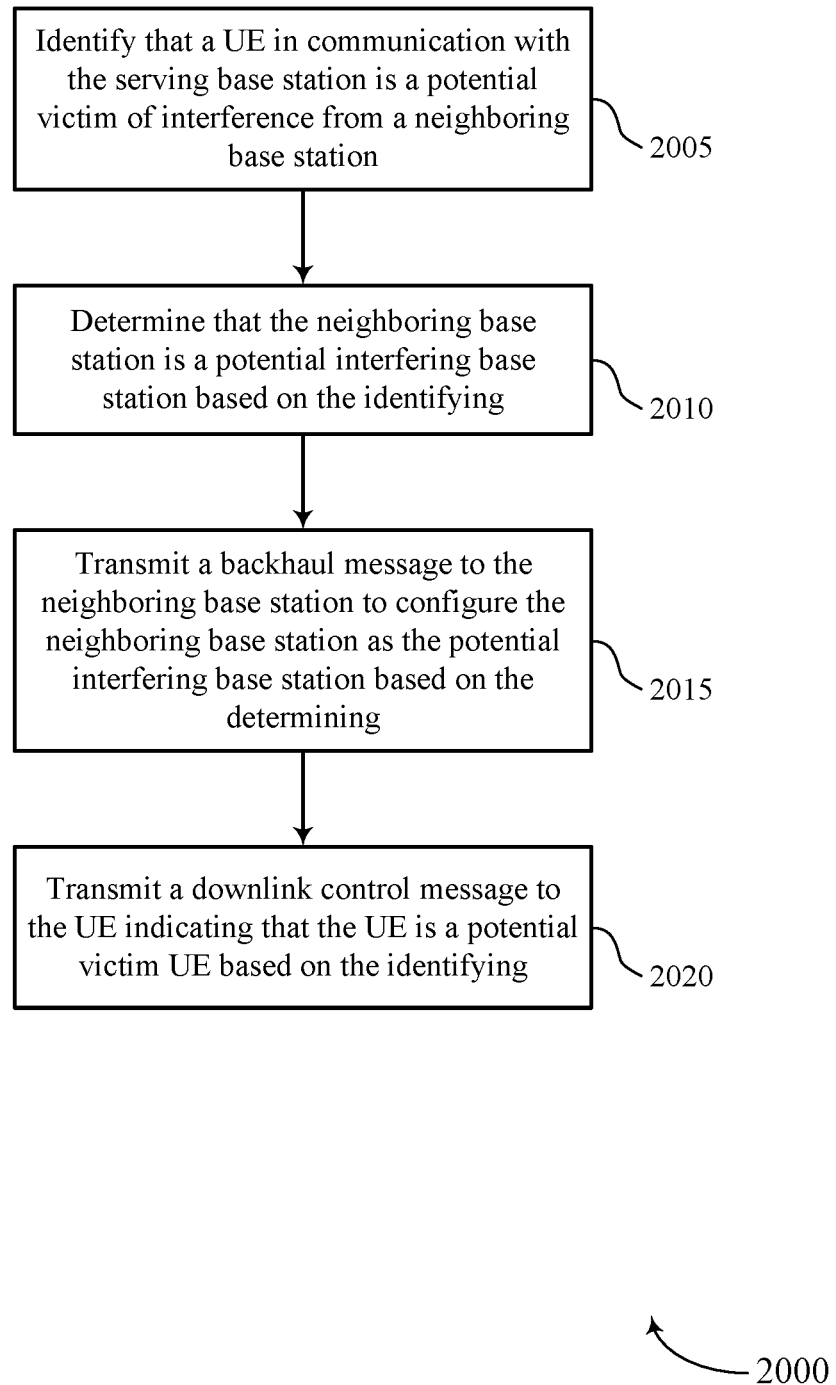

FIG. 20 shows a flowchart illustrating a method 2000 that supports over the air interference coordination in accordance with aspects of the present disclosure. The operations of method 2000 may be implemented by a base station 105 or its components as described herein. For example, the operations of method 2000 may be performed by an interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2005, the base station may identify that a UE in communication with the serving base station is a potential victim of interference from a neighboring base station. The operations of 2005 may be performed according to the methods described herein. In some examples, aspects of the operations of 2005 may be performed by a victim identifier as described with reference to FIGS. 11 through 14.

At 2010, the base station may determine that the neighboring base station is a potential interfering base station based on the identifying. The operations of 2010 may be performed according to the methods described herein. In some examples, aspects of the operations of 2010 may be performed by a victim identifier as described with reference to FIGS. 11 through 14.

At 2015, the base station may transmit a backhaul message to the neighboring base station to configure the neighboring base station as the potential interfering base station based on the determining. The operations of 2015 may be performed according to the methods described herein. In some examples, aspects of the operations of 2015 may be performed by a backhaul transmitter as described with reference to FIGS. 11 through 14.

At 2020, the base station may transmit a downlink control message to the UE indicating that the UE is a potential victim UE based on the identifying. The operations of 2020 may be performed according to the methods described herein. In some examples, aspects of the operations of 2020 may be performed by a message transmitter as described with reference to FIGS. 11 through 14.

Figure 21:
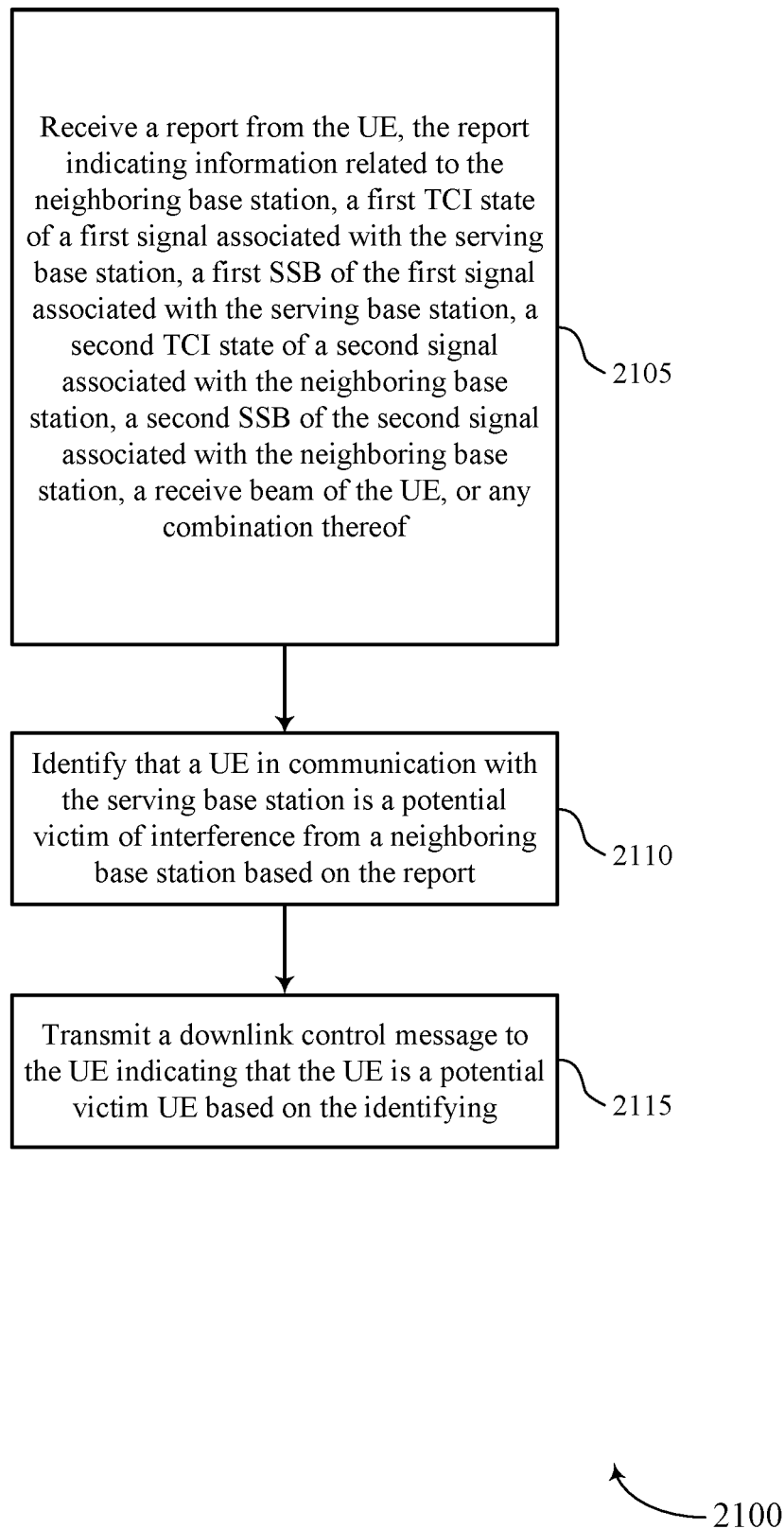

FIG. 21 shows a flowchart illustrating a method 2100 that supports over the air interference coordination in accordance with aspects of the present disclosure. The operations of method 2100 may be implemented by a base station 105 or its components as described herein. For example, the operations of method 2100 may be performed by an interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2105, the base station may receive a report from the UE, the report indicating information related to the neighboring base station, a first TCI state of a first signal associated with the serving base station, a first SSB of the first signal associated with the serving base station, a second TCI state of a second signal associated with the neighboring base station, a second SSB of the second signal associated with the neighboring base station, a receive beam of the UE, or any combination thereof. The operations of 2105 may be performed according to the methods described herein. In some examples, aspects of the operations of 2105 may be performed by a report receiver as described with reference to FIGS. 11 through 14.

At 2110, the base station may identify that a UE in communication with the serving base station is a potential victim of interference from a neighboring base station based on the report. The operations of 2110 may be performed according to the methods described herein. In some examples, aspects of the operations of 2110 may be performed by a victim identifier as described with reference to FIGS. 11 through 14.

At 2115, the base station may transmit a downlink control message to the UE indicating that the UE is a potential victim UE based on the identifying. The operations of 2115 may be performed according to the methods described herein. In some examples, aspects of the operations of 2115 may be performed by a message transmitter as described with reference to FIGS. 11 through 14.

Figure 22:
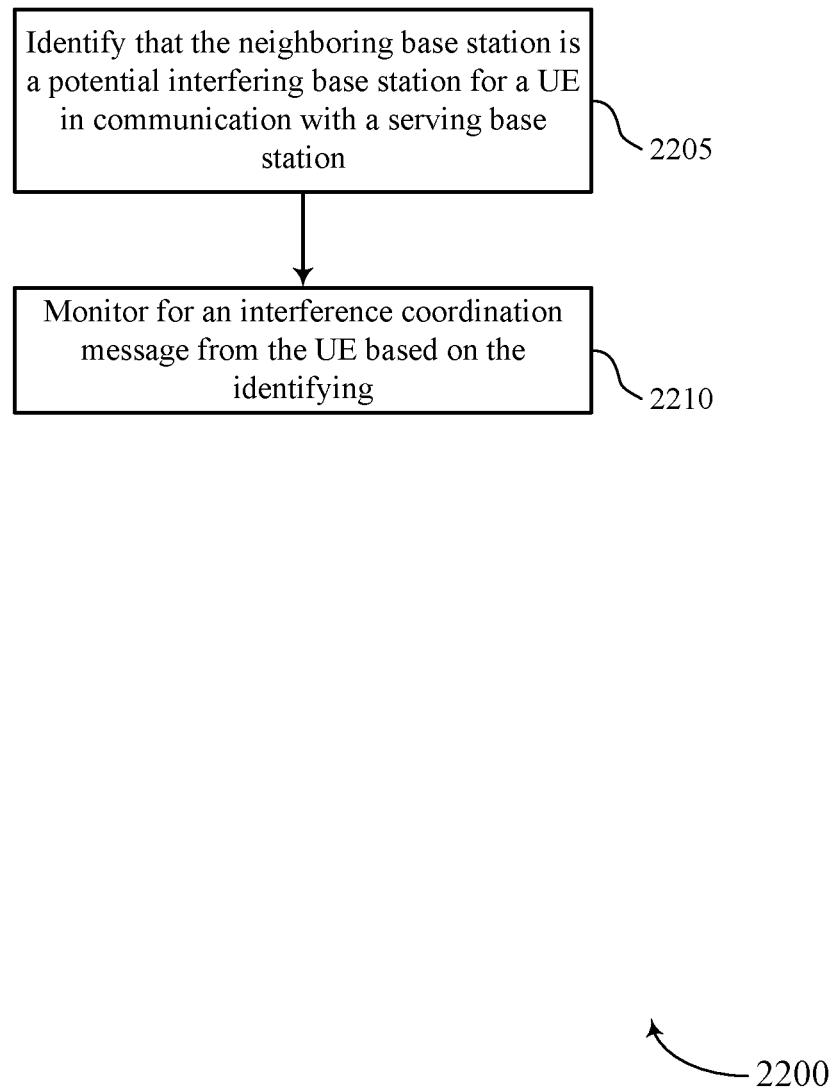

FIG. 22 shows a flowchart illustrating a method 2200 that supports over the air interference coordination in accordance with aspects of the present disclosure. The operations of method 2200 may be implemented by a base station 105 or its components as described herein. For example, the operations of method 2200 may be performed by an interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2205, the base station may identify that the neighboring base station is a potential interfering base station for a UE in communication with a serving base station. The operations of 2205 may be performed according to the methods described herein. In some examples, aspects of the operations of 2205 may be performed by a victim identifier as described with reference to FIGS. 11 through 14.

At 2210, the base station may monitor for an interference coordination message from the UE based on the identifying. The operations of 2210 may be performed according to the methods described herein. In some examples, aspects of the operations of 2210 may be performed by an interference message monitor as described with reference to FIGS. 11 through 14.

Figure 23:
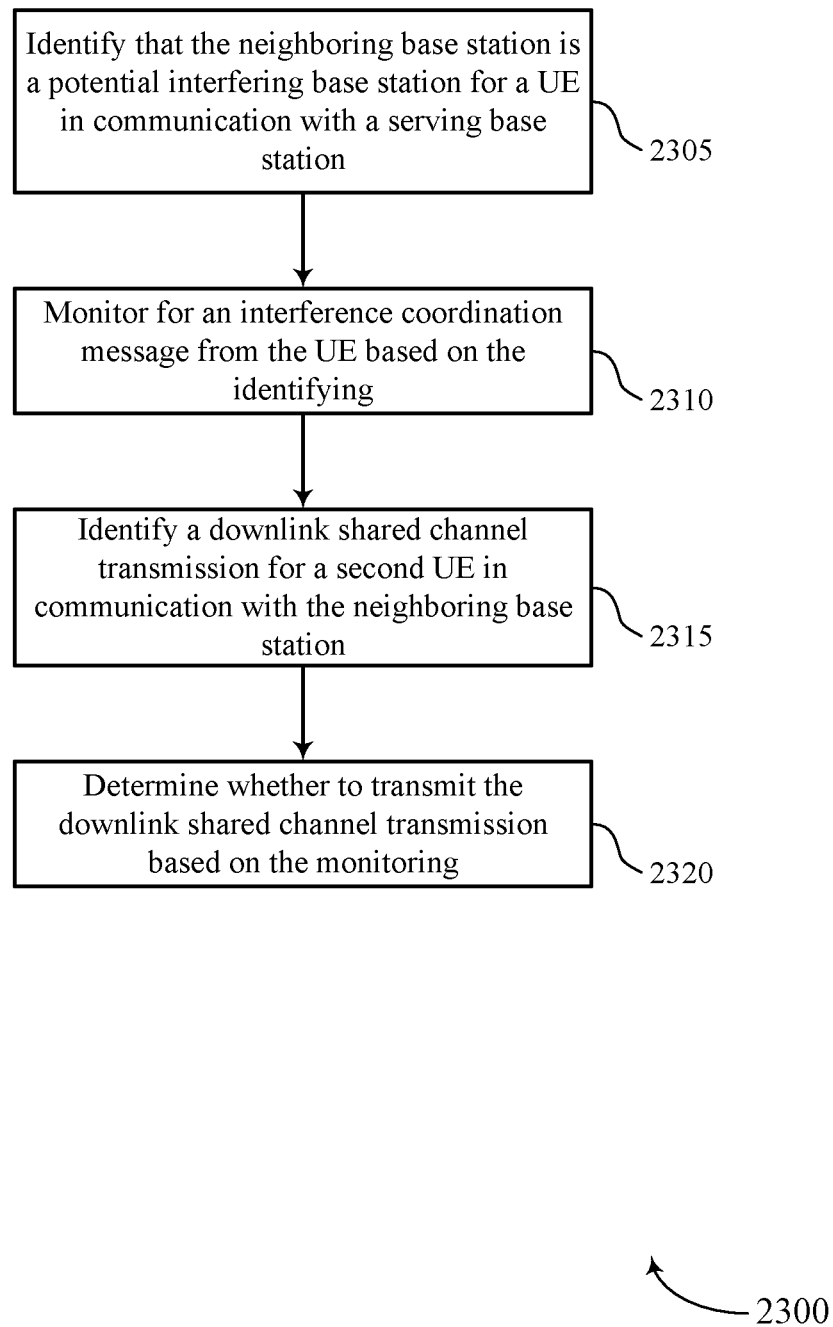

FIG. 23 shows a flowchart illustrating a method 2300 that supports over the air interference coordination in accordance with aspects of the present disclosure. The operations of method 2300 may be implemented by a base station 105 or its components as described herein. For example, the operations of method 2300 may be performed by an interference manager as described with reference to FIGS. 11 through 14.

In some examples, a base station may execute a set of instructions to control the functional elements of the base station to perform the functions described herein. Additionally or alternatively, a base station may perform aspects of the functions described herein using special-purpose hardware.

At 2305, the base station may identify that the neighboring base station is a potential interfering base station for a UE in communication with a serving base station. The operations of 2305 may be performed according to the methods described herein. In some examples, aspects of the operations of 2305 may be performed by a victim identifier as described with reference to FIGS. 11 through 14.

At 2310, the base station may monitor for an interference coordination message from the UE based on the identifying. The operations of 2310 may be performed according to the methods described herein. In some examples, aspects of the operations of 2310 may be performed by an interference message monitor as described with reference to FIGS. 11 through 14.

At 2315, the base station may identify a downlink shared channel transmission for a second UE in communication with the neighboring base station. The operations of 2315 may be performed according to the methods described herein. In some examples, aspects of the operations of 2315 may be performed by a shared channel component as described with reference to FIGS. 11 through 14.

At 2320, the base station may determine whether to transmit the downlink shared channel transmission based on the monitoring. The operations of 2320 may be performed according to the methods described herein. In some examples, aspects of the operations of 2320 may be performed by a shared channel component as described with reference to FIGS. 11 through 14.

Figure 24:
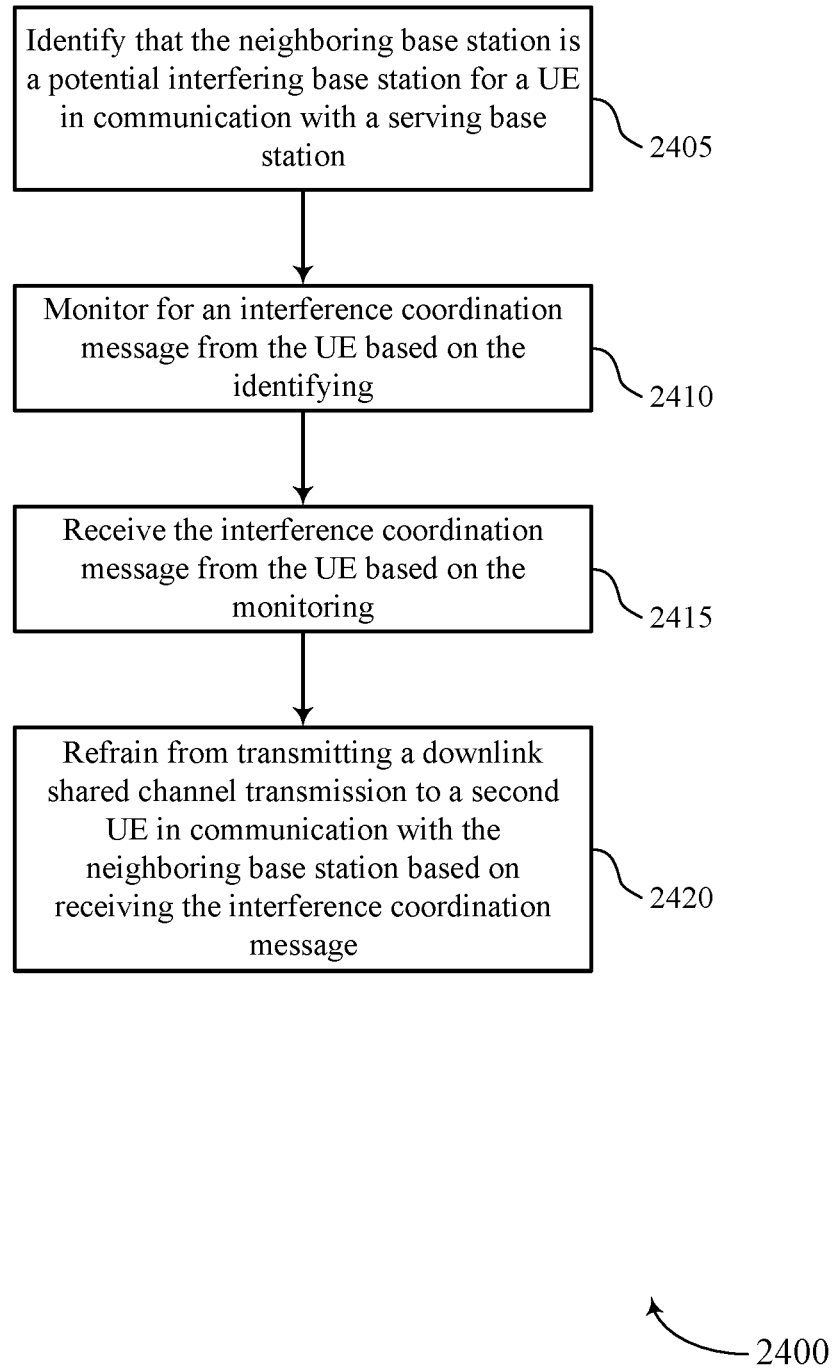

FIG. 24 shows a flowchart illustrating a method 2400 that supports over the air interference coordination in accordance with aspects of the present disclosure. The operations of method 2400 may be implemented by a base station 105 or its components as described herein. For example, the operations of method 2400 may be performed by an interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2405, the base station may identify that the neighboring base station is a potential interfering base station for a UE in communication with a serving base station. The operations of 2405 may be performed according to the methods described herein. In some examples, aspects of the operations of 2405 may be performed by a victim identifier as described with reference to FIGS. 11 through 14.

At 2410, the base station may monitor for an interference coordination message from the UE based on the identifying. The operations of 2410 may be performed according to the methods described herein. In some examples, aspects of the operations of 2410 may be performed by an interference message monitor as described with reference to FIGS. 11 through 14.

At 2415, the base station may receive the interference coordination message from the UE based on the monitoring. The operations of 2415 may be performed according to the methods described herein. In some examples, aspects of the operations of 2415 may be performed by an interference message monitor as described with reference to FIGS. 11 through 14.

At 2420, the base station may refrain from transmitting a downlink shared channel transmission to a second UE in communication with the neighboring base station based on receiving the interference coordination message. The operations of 2420 may be performed according to the methods described herein. In some examples, aspects of the operations of 2420 may be performed by a shared channel component as described with reference to FIGS. 11 through 14.

Figure 25:
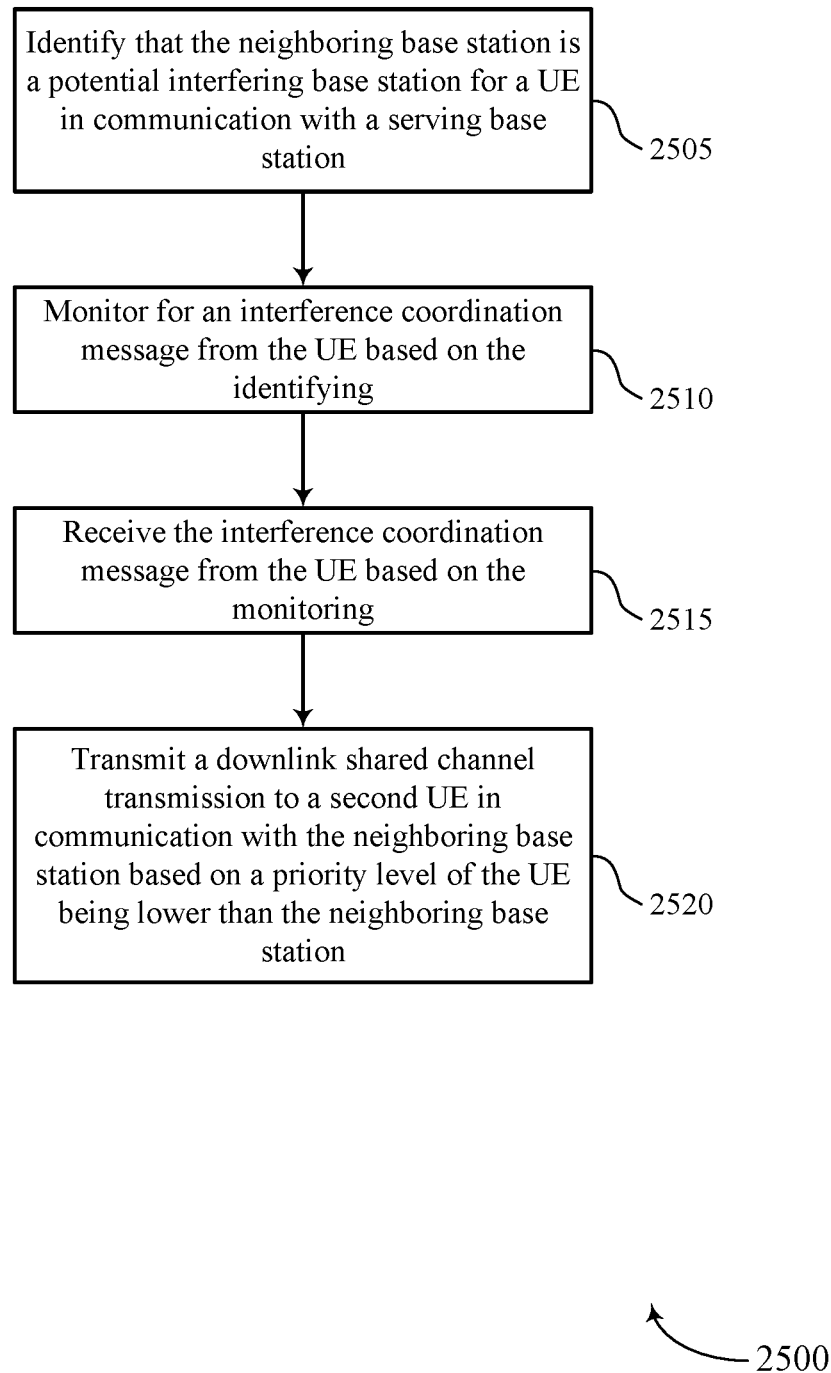

FIG. 25 shows a flowchart illustrating a method 2500 that supports over the air interference coordination in accordance with aspects of the present disclosure. The operations of method 2500 may be implemented by a base station 105 or its components as described herein. For example, the operations of method 2500 may be performed by an interference manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 2505, the base station may identify that the neighboring base station is a potential interfering base station for a UE in communication with a serving base station. The operations of 2505 may be performed according to the methods described herein. In some examples, aspects of the operations of 2505 may be performed by a victim identifier as described with reference to FIGS. 11 through 14.

At 2510, the base station may monitor for an interference coordination message from the UE based on the identifying. The operations of 2510 may be performed according to the methods described herein. In some examples, aspects of the operations of 2510 may be performed by an interference message monitor as described with reference to FIGS. 11 through 14.

At 2515, the base station may receive the interference coordination message from the UE based on the monitoring. The operations of 2515 may be performed according to the methods described herein. In some examples, aspects of the operations of 2515 may be performed by an interference message monitor as described with reference to FIGS. 11 through 14.

At 2520, the base station may transmit a downlink shared channel transmission to a second UE in communication with the neighboring base station based on a priority level of the UE being lower than the neighboring base station. The operations of 2520 may be performed according to the methods described herein. In some examples, aspects of the operations of 2520 may be performed by a shared channel component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Described herein are a number of examples of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Example 1: A method for communications at a user equipment (UE), comprising: identifying, by the UE in communication with a serving base station, that the UE is a potential victim of interference from a neighboring base station; transmitting an interference coordination message to the neighboring base station based at least in part on the identifying, the interference coordination message requesting modification of one or more transmission parameters at the neighboring base station; and communicating with the serving base station after transmitting the interference coordination message.

Example 2: The method of example 1, further comprising: monitoring for signaling from at least one of the serving base station or the neighboring base station using a receive beam of the UE; receiving signaling from both the serving base station and the neighboring base station based at least in part on the monitoring; and identifying that the UE is the potential victim of interference from the neighboring base station based at least in part on the receiving.

Example 3: The method of examples 1 or 2, further comprising: configuring the UE as a potential victim UE according to a set of UE receive beams, a set of serving base station transmit beams, and a set of neighboring base station transmit beams based at least in part on the identifying.

Example 4: The method of any of examples 1 through 3, further comprising: receiving an indication from the serving station to transmit the interference coordination message to the neighboring base station, wherein the UE is identified as the potential victim based at least in part on the indication; and transmitting the interference coordination message to the neighboring base station in a direction based at least in part on the indication.

Example 5: The method of any of examples 1 through 4, further comprising: monitoring for signaling from a plurality of base stations via a set of receive beams, the plurality of base stations including the serving base station and the neighboring base station; and determining that the UE is a potential victim UE based at least in part on the monitoring.

Example 6: The method of example 5, further comprising: receiving a first signal from the serving base station via a first receive beam of the set of receive beams based at least in part on the monitoring, the first signal associated with a first transmission configuration indicator (TCI) state or a first synchronization signal block (SSB) of the serving base station; receiving a second signal from the neighboring base station via the first receive beam of the set of receive beams based at least in part on the monitoring, the second signal associated with a second TCI state or a second SSB of the neighboring base station; and determining that the neighboring base station is a potential interfering base station based at least in part on receiving the first and second signals.

Example 7: The method of example 6, further comprising: transmitting a report to the serving base station based at least in part on determining that the neighboring base station is the potential interfering base station, the report indicating information related to the neighboring base station, the first TCI state, the second TCI state, the first SSB, the second SSB, the first receive beam, or any combination thereof.

Example 8: The method of example 7, wherein the report is transmitted via radio resource control (RRC) signaling.

Example 9: The method of any of examples 1 through 8, further comprising: receiving a downlink control message from the serving base station, the downlink control message indicating a transmission configuration indicator (TCI) state for a downlink shared channel transmission; and transmitting the interference coordination message to the neighboring base station before the downlink shared channel transmission.

Example 10: The method of example 9, wherein the downlink control message indicates resources for the interference coordination message and information to include in the interference coordination message.

Example 11: The method of example 9, further comprising: transmitting the interference coordination message via a same beam or a different beam than a beam used for the downlink shared channel transmission.

Example 12: The method of example 9, further comprising: receiving an indication of a beam index for transmission of the interference coordination message via one of radio resource control (RRC) signaling, a media access control (MAC) control element (MAC-CE), or the downlink control message; and transmitting the interference coordination message via a transmission beam corresponding to the beam index.

Example 13: The method of example 9, further comprising: identifying a gap between transmission of the interference coordination message and the downlink shared channel transmission; and monitoring resources allocated for the downlink shared channel transmission according to the gap following transmission of the interference coordination message.

Example 14: The method of example 13, wherein the gap is common to the serving base station and the neighboring base station.

Example 15: The method of example 13, wherein the gap is preconfigured at the UE, the serving base station, and the neighboring base station.

Example 16: The method of example 13, further comprising: receiving an indication of the gap from the serving base station via one of radio resource control (RRC) signaling, a media access control (MAC) control element (MAC-CE), or the downlink control message.

Example 17: The method of example 9, wherein the downlink control message comprises downlink control information (DCI) carried via a physical downlink control channel (PDCCH).

Example 18: The method of any of examples 1 through 17, further comprising: including an indication of UE priority in the interference coordination message.

Example 19: An apparatus comprising at least one means for performing a method of any of examples 1 through 18.

Example 20: An apparatus for wireless communications comprising: a processor; memory coupled with the processor; and instructions stored in the memory and executable by the processor to cause the apparatus to perform a method of any of examples 1 through 18.

Example 21: A non-transitory computer-readable medium storing code for wireless communications, the code comprising instructions executable by a processor to perform a method of any of examples 1 through 18.

Example 22: A method for wireless communications at a serving base station, comprising: identifying that a user equipment (UE) in communication with the serving base station is a potential victim of interference from a neighboring base station; and transmitting a downlink control message to the UE indicating that the UE is a potential victim UE based at least in part on the identifying.

Example 23: The method of example 22, further comprising: determining that the neighboring base station is a potential interfering base station based at least in part on the identifying; and transmitting a backhaul message to the neighboring base station to configure the neighboring base station as the potential interfering base station based at least in part on the determining.

Example 24: The method of examples 22 or 23, further comprising: identifying a set of beam pairs associated with the UE, the serving base station, and the neighboring base station; and identifying that the UE is the potential victim of interference from the neighboring base station based at least in part on the set of beam pairs.

Example 25: The method of any of examples 22 through 24, further comprising: receiving a report from the UE, the report indicating information related to the neighboring base station, a first transmission configuration indicator (TCI) state of a first signal associated with the serving base station, a first synchronization signal block (SSB) of the first signal associated with the serving base station, a second TCI state of a second signal associated with the neighboring base station, a second SSB of the second signal associated with the neighboring base station, a receive beam of the UE, or any combination thereof; and identifying that the UE is the potential victim of interference from the neighboring base station based at least in part on the report.

Example 26: The method of example 25, further comprising: transmitting a backhaul message to the neighboring base station indicating that the neighboring base station is a potential interfering base station based at least in part on the report, wherein the backhaul message comprises an indication of the potential victim UE and information related to the second TCI state, the second SSB, the serving base station, a transmission beam associated with the second TCI state or the second SSB, or any combination thereof.

Example 27: The method of any of examples 22 through 26, wherein the downlink control message indicates a transmission configuration indicator (TCI) state for a downlink shared channel transmission to the UE, resources for an interference coordination message from the UE, information to include in the interference coordination message, an indication for the UE to transmit the interference coordination message to the neighboring base station, or any combination thereof.

Example 28: The method of example 27, wherein the information to include in the interference coordination message comprises a set of time-frequency resources allocated for transmission of the interference coordination message, transmission timing for the interference coordination message, an uplink transmission beam index for the interference coordination message, or any combination thereof.

Example 29: The method of example 27, further comprising: transmitting an indication of a beam index for transmission of an interference coordination message via one of radio resource control (RRC) signaling, a media access control (MAC) control element (MAC-CE), or downlink control information (DCI), wherein the beam index is a same or different index than a beam used for reception of the downlink shared channel transmission.

Example 30: The method of any of examples 22 through 29, further comprising: transmitting an indication of a gap to the UE via one of radio resource control (RRC) signaling, a media access control (MAC) control element (MAC-CE), or downlink control information (DCI), wherein the gap is common to the serving base station and the neighboring base station and indicates a delay between transmission of an interference coordination message and a downlink shared channel transmission.

Example 31: The method of example 30, further comprising: transmitting a backhaul message to the neighboring base station indicating the gap.

Example 32: The method of any of examples 22 through 31, wherein a gap between an interference coordination message from the UE and a downlink shared channel transmission from the neighboring base station is a default value configured at the serving base station, the UE, and the neighboring base station.

Example 33: An apparatus comprising at least one means for performing a method of any of examples 22 through 32.

Example 34: An apparatus for wireless communications comprising: a processor; memory coupled with the processor; and instructions stored in the memory and executable by the processor to cause the apparatus to perform a method of any of examples 22 through 32.

Example 35: A non-transitory computer-readable medium storing code for wireless communications, the code comprising instructions executable by a processor to perform a method of any of examples 22 through 32.

Example 36: A method for wireless communications at a neighboring base station, comprising: identifying that the neighboring base station is a potential interfering base station for a user equipment (UE) in communication with a serving base station; and monitoring for an interference coordination message from the UE based at least in part on the identifying.

Example 37: The method of example 36, further comprising: identifying a downlink shared channel transmission for a second UE in communication with the neighboring base station; and determining whether to transmit the downlink shared channel transmission based at least in part on the monitoring.

Example 38: The method of example 37, further comprising: receiving a backhaul message from the serving base station to configure the neighboring base station as the potential interfering base station based at least in part on the determining; and configuring the neighboring base station as the potential interfering base station based at least in part on the backhaul message.

Example 39: The method of example 37, further comprising: receiving a backhaul message from the serving base station indicating the UE as a potential victim UE, the backhaul message comprising an indication of an interfering transmission beam for the neighboring base station, an interfering transmission configuration indicator (TCI) state for the neighboring base station, an interfering synchronization signal block (SSB) for the neighboring base station, or any combination thereof.

Example 40: The method of example 39, further comprising: monitoring for the interference coordination message using the interfering transmission beam; and transmitting the downlink shared channel transmission to the second UE based at least in part on an absence of the interference coordination message using the interfering transmission beam during the monitoring.

Example 41: The method of example 39, further comprising: monitoring for the interference coordination message using the interfering transmission beam; and refraining from transmitting the downlink shared channel transmission to the second UE based at least in part on detecting the interference coordination message using the interfering transmission beam during the monitoring.

Example 42: The method of any of examples 36 through 41, further comprising: receiving an indication of a gap from the serving base station, wherein the gap is common to the serving base station and the neighboring base station and indicates a delay between transmission of the interference coordination message and a downlink shared channel transmission for a second UE in communication with the neighboring base station.

Example 43: The method of any of examples 36 through 42, further comprising: identifying a gap that indicates a delay between transmission of the interference coordination message and a downlink shared channel transmission for a second UE in communication with the neighboring base station, wherein the gap is a fixed value preconfigured at the serving base station, the UE, and the neighboring base station.

Example 44: The method of any of examples 36 through 43, further comprising: receiving the interference coordination message from the UE based at least in part on the monitoring, wherein the interference coordination message is received via a same or different beam than a beam for a downlink shared channel transmission for a second UE in communication with the neighboring base station.

Example 45: The method of any of examples 36 through 44, further comprising: receiving the interference coordination message from the UE based at least in part on the monitoring; and transmitting downlink control information (DCI) to a second UE in communication with the neighboring base station, the DCI indicating cancellation of a downlink shared channel transmission for the second UE based at least in part on receiving the interference coordination message.

Example 46: The method of any of examples 36 through 45, further comprising: receiving the interference coordination message from the UE based at least in part on the monitoring; and refraining from transmitting a downlink shared channel transmission to a second UE in communication with the neighboring base station based at least in part on receiving the interference coordination message.

Example 47: The method of any of examples 36 through 46, further comprising: receiving the interference coordination message from the UE based at least in part on the monitoring; and transmitting a downlink shared channel transmission to a second UE in communication with the neighboring base station based at least in part on a priority level of the UE being lower than the neighboring base station.

Example 48: The method of example 47, wherein the interference coordination message indicates the priority level of the UE.

Example 49: The method of example 47, further comprising: receiving a backhaul message from the serving base station indicating the priority level of the UE.

Example 50: An apparatus comprising at least one means for performing a method of any of examples 36 through 49.

Example 51: An apparatus for wireless communications comprising: a processor; memory coupled with the processor; and instructions stored in the memory and executable by the processor to cause the apparatus to perform a method of any of examples 36 through 49.

Example 52: A non-transitory computer-readable medium storing code for wireless communications, the code comprising instructions executable by a processor to perform a method of any of examples 36 through 49.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying, by the UE in communication with a serving base station, that the UE is a potential victim of interference from a neighboring base station;
   transmitting an interference coordination message to the neighboring base station based at least in part on the identifying, the interference coordination message requesting modification of one or more transmission parameters at the neighboring base station; and
   communicating with the serving base station after transmitting the interference coordination message.

2. The method of claim 1, further comprising:
   monitoring for signaling from at least one of the serving base station or the neighboring base station using a receive beam of the UE;
   receiving signaling from both the serving base station and the neighboring base station based at least in part on the monitoring; and
   identifying that the UE is the potential victim of interference from the neighboring base station based at least in part on the receiving.

3. The method of claim 1, further comprising:
   configuring the UE as a potential victim UE according to a set of UE receive beams, a set of serving base station transmit beams, and a set of neighboring base station transmit beams based at least in part on the identifying.

4. The method of claim 1, further comprising:
   receiving an indication from the serving base station to transmit the interference coordination message to the neighboring base station, wherein the UE is identified as the potential victim based at least in part on the indication; and
   transmitting the interference coordination message to the neighboring base station in a direction based at least in part on the indication.

5. The method of claim 1, further comprising:
   monitoring for signaling from a plurality of base stations via a set of receive beams, the plurality of base stations including the serving base station and the neighboring base station; and
   determining that the UE is a potential victim UE based at least in part on the monitoring.

6. The method of claim 5, further comprising:
   receiving a first signal from the serving base station via a first receive beam of the set of receive beams based at least in part on the monitoring, the first signal associated with a first transmission configuration indicator (TCI) state or a first synchronization signal block (SSB) of the serving base station;
   receiving a second signal from the neighboring base station via the first receive beam of the set of receive beams based at least in part on the monitoring, the second signal associated with a second TCI state or a second SSB of the neighboring base station; and
   determining that the neighboring base station is a potential interfering base station based at least in part on receiving the first and second signals.

7. The method of claim 6, further comprising:
   transmitting a report to the serving base station based at least in part on determining that the neighboring base station is the potential interfering base station, the report indicating information related to the neighboring base station, the first TCI state, the second TCI state, the first SSB, the second SSB, the first receive beam, or any combination thereof.

8. The method of claim 1, further comprising:
   receiving a downlink control message from the serving base station, the downlink control message indicating a transmission configuration indicator (TCI) state for a downlink shared channel transmission; and
   transmitting the interference coordination message to the neighboring base station before the downlink shared channel transmission.

9. The method of claim 8, wherein the downlink control message indicates resources for the interference coordination message and information to include in the interference coordination message.

10. The method of claim 8, further comprising:
identifying a gap between transmission of the interference coordination message and the downlink shared channel transmission; and
monitoring resources allocated for the downlink shared channel transmission according to the gap following transmission of the interference coordination message.

11. The method of claim 1, further comprising:
including an indication of UE priority in the interference coordination message.

12. A method for wireless communications at a serving base station, comprising:
identifying that a user equipment (UE) in communication with the serving base station is a potential victim of interference from a neighboring base station; and
transmitting a downlink control message to the UE indicating that the UE is a potential victim UE based at least in part on the identifying.

13. The method of claim 12, further comprising:
determining that the neighboring base station is a potential interfering base station based at least in part on the identifying; and
transmitting a backhaul message to the neighboring base station to configure the neighboring base station as the potential interfering base station based at least in part on the determining.

14. The method of claim 12, further comprising:
identifying a set of beam pairs associated with the UE, the serving base station, and the neighboring base station; and
identifying that the UE is the potential victim of interference from the neighboring base station based at least in part on the set of beam pairs.

15. The method of claim 12, further comprising:
receiving a report from the UE, the report indicating information related to the neighboring base station, a first transmission configuration indicator (TCI) state of a first signal associated with the serving base station, a first synchronization signal block (SSB) of the first signal associated with the serving base station, a second TCI state of a second signal associated with the neighboring base station, a second SSB of the second signal associated with the neighboring base station, a receive beam of the UE, or any combination thereof; and
identifying that the UE is the potential victim of interference from the neighboring base station based at least in part on the report.

16. The method of claim 15, further comprising:
transmitting a backhaul message to the neighboring base station indicating that the neighboring base station is a potential interfering base station based at least in part on the report, wherein the backhaul message comprises an indication of the potential victim UE and information related to the second TCI state, the second SSB, the serving base station, a transmission beam associated with the second TCI state or the second SSB, or any combination thereof.

17. The method of claim 12, wherein the downlink control message indicates a transmission configuration indicator (TCI) state for a downlink shared channel transmission to the UE, resources for an interference coordination message from the UE, information to include in the interference coordination message, an indication for the UE to transmit the interference coordination message to the neighboring base station, or any combination thereof.

18. The method of claim 17, wherein the information to include in the interference coordination message comprises a set of time-frequency resources allocated for transmission of the interference coordination message, transmission timing for the interference coordination message, an uplink transmission beam index for the interference coordination message, or any combination thereof.

19. The method of claim 12, further comprising:
transmitting an indication of a gap to the UE via one of radio resource control (RRC) signaling, a media access control (MAC) control element (MAC-CE), or downlink control information (DCI), wherein the gap is common to the serving base station and the neighboring base station and indicates a delay between transmission of an interference coordination message and a downlink shared channel transmission; and
transmitting a backhaul message to the neighboring base station indicating the gap.

20. The method of claim 12, wherein a gap between an interference coordination message from the UE and a downlink shared channel transmission from the neighboring base station is a default value configured at the serving base station, the UE, and the neighboring base station.

21. A method for wireless communications at a neighboring base station, comprising:
identifying that the neighboring base station is a potential interfering base station for a user equipment (UE) in communication with a serving base station;
monitoring for an interference coordination message from the UE based at least in part on the identifying;
identifying a downlink shared channel transmission for a second UE in communication with the neighboring base station; and
determining whether to transmit the downlink shared channel transmission based at least in part on the monitoring.

22. The method of claim 21, further comprising:
receiving a backhaul message from the serving base station to configure the neighboring base station as the potential interfering base station based at least in part on the determining; and
configuring the neighboring base station as the potential interfering base station based at least in part on the backhaul message.

23. The method of claim 21, further comprising:
receiving a backhaul message from the serving base station indicating the UE as a potential victim UE, the backhaul message comprising an indication of an interfering transmission beam for the neighboring base station, an interfering transmission configuration indicator (TCI) state for the neighboring base station, an interfering synchronization signal block (SSB) for the neighboring base station, or any combination thereof.

24. The method of claim 23, further comprising:
monitoring for the interference coordination message using the interfering transmission beam; and
transmitting the downlink shared channel transmission to the second UE based at least in part on an absence of the interference coordination message using the interfering transmission beam during the monitoring.

25. The method of claim 23, further comprising:
monitoring for the interference coordination message using the interfering transmission beam; and
refraining from transmitting the downlink shared channel transmission to the second UE based at least in part on detecting the interference coordination message using the interfering transmission beam during the monitoring.

26. The method of claim 21, further comprising:
receiving an indication of a gap from the serving base station, wherein the gap is common to the serving base station and the neighboring base station and indicates a delay between transmission of the interference coordination message and the downlink shared channel transmission for the second UE in communication with the neighboring base station.

27. The method of claim 21, further comprising:
identifying a gap that indicates a delay between transmission of the interference coordination message and the downlink shared channel transmission for the second UE in communication with the neighboring base station, wherein the gap is a fixed value preconfigured at the serving base station, the UE, and the neighboring base station.

28. The method of claim 21, further comprising:
receiving the interference coordination message from the UE based at least in part on the monitoring; and
refraining from transmitting the downlink shared channel transmission to the second UE in communication with the neighboring base station based at least in part on receiving the interference coordination message.

29. The method of claim 21, further comprising:
receiving the interference coordination message from the UE based at least in part on the monitoring; and
transmitting the downlink shared channel transmission to the second UE in communication with the neighboring base station based at least in part on a priority level of the UE being lower than the neighboring base station.

30. An apparatus for wireless communications at a user equipment (UE), comprising:
a processor,
memory coupled with the processor; and
instructions stored in the memory and executable by the processor to cause the apparatus to:
identify, by the UE in communication with a serving base station, that the UE is a potential victim of interference from a neighboring base station;
transmit an interference coordination message to the neighboring base station based at least in part on the identifying, the interference coordination message requesting modification of one or more transmission parameters at the neighboring base station; and
communicate with the serving base station after transmitting the interference coordination message.

31. The apparatus of claim 30, wherein the instructions are further executable by the processor to cause the apparatus to:
monitor for signaling from at least one of the serving base station or the neighboring base station using a receive beam of the UE;
receive signaling from both the serving base station and the neighboring base station based at least in part on the monitoring; and
identify that the UE is the potential victim of interference from the neighboring base station based at least in part on the receiving.

32. The apparatus of claim 30, wherein the instructions are further executable by the processor to cause the apparatus to:
configure the UE as a potential victim UE according to a set of UE receive beams, a set of serving base station transmit beams, and a set of neighboring base station transmit beams based at least in part on the identifying.

33. The apparatus of claim 30, wherein the instructions are further executable by the processor to cause the apparatus to:
receive an indication from the serving base station to transmit the interference coordination message to the neighboring base station, wherein the UE is identified as the potential victim based at least in part on the indication; and
transmit the interference coordination message to the neighboring base station in a direction based at least in part on the indication.

34. The apparatus of claim 30, wherein the instructions are further executable by the processor to cause the apparatus to:
monitor for signaling from a plurality of base stations via a set of receive beams, the plurality of base stations including the serving base station and the neighboring base station; and
determine that the UE is a potential victim UE based at least in part on the monitoring.

35. An apparatus for wireless communications at a serving base station, comprising:
a processor;
memory coupled with the processor; and
instructions stored in the memory and executable by the processor to cause the apparatus to:
identify that a user equipment (UE) in communication with the serving base station is a potential victim of interference from a neighboring base station; and
transmit a downlink control message to the UE indicating that the UE is a potential victim UE based at least in part on the identifying.

36. The apparatus of claim 35, wherein the instructions are further executable by the processor to cause the apparatus to:
determine that the neighboring base station is a potential interfering base station based at least in part on the identifying; and
transmit a backhaul message to the neighboring base station to configure the neighboring base station as the potential interfering base station based at least in part on the determining.

37. The apparatus of claim 35, wherein the instructions are further executable by the processor to cause the apparatus to:
identify a set of beam pairs associated with the UE, the serving base station, and the neighboring base station; and
identify that the UE is the potential victim of interference from the neighboring base station based at least in part on the set of beam pairs.

38. The apparatus of claim 35, wherein the instructions are further executable by the processor to cause the apparatus to:
receive a report from the UE, the report indicating information related to the neighboring base station, a first transmission configuration indicator (TCI) state of a first signal associated with the serving base station, a first synchronization signal block (SSB) of the first signal associated with the serving base station, a second TCI state of a second signal associated with the neighboring base station, a second SSB of the second signal associated with the neighboring base station, a receive beam of the UE, or any combination thereof; and
identify that the UE is the potential victim of interference from the neighboring base station based at least in part on the report.

39. The apparatus of claim 38, wherein the instructions are further executable by the processor to cause the apparatus to:

transmit a backhaul message to the neighboring base station indicating that the neighboring base station is a potential interfering base station based at least in part on the report, wherein the backhaul message comprises an indication of the potential victim UE and information related to the second TCI state, the second SSB, the serving base station, a transmission beam associated with the second TCI state or the second SSB, or any combination thereof.

40. An apparatus for wireless communications at a neighboring base station, comprising:

a processor;
memory coupled with the processor; and
instructions stored in the memory and executable by the processor to cause the apparatus to:
identify that the neighboring base station is a potential interfering base station for a user equipment (UE) in communication with a serving base station;
monitor for an interference coordination message from the UE based at least in part on the identifying;
identify a downlink shared channel transmission for a second UE in communication with the neighboring base station; and
determine whether to transmit the downlink shared channel transmission based at least in part on the monitoring.

41. The apparatus of claim 40, wherein the instructions are further executable by the processor to cause the apparatus to:

receive a backhaul message from the serving base station to configure the neighboring base station as the potential interfering base station based at least in part on the determining; and configure the neighboring base station as the potential interfering base station based at least in part on the backhaul message.

42. The apparatus of claim 40, wherein the instructions are further executable by the processor to cause the apparatus to:

receive a backhaul message from the serving base station indicating the UE as a potential victim UE, the backhaul message comprising an indication of an interfering transmission beam for the neighboring base station, an interfering transmission configuration indicator (TCI) state for the neighboring base station, an interfering synchronization signal block (SSB) for the neighboring base station, or any combination thereof.

43. The apparatus of claim 42, wherein the instructions are further executable by the processor to cause the apparatus to:

monitor for the interference coordination message using the interfering transmission beam; and
transmit the downlink shared channel transmission to the second UE based at least in part on an absence of the interference coordination message using the interfering transmission beam during the monitoring.

44. The apparatus of claim 42, wherein the instructions are further executable by the processor to cause the apparatus to:

monitor for the interference coordination message using the interfering transmission beam; and
refrain from transmitting the downlink shared channel transmission to the second UE based at least in part on detecting the interference coordination message using the interfering transmission beam during the monitoring.

\* \* \* \* \*